United States Patent
Aten et al.

(10) Patent No.: US 7,763,680 B2
(45) Date of Patent: Jul. 27, 2010

(54) MELT-FABRICABLE CORE/SHELL PERFLUOROPOLYMER

(75) Inventors: Ralph Munson Aten, Chadds Ford, PA (US); Heidi Elizabeth Burch, Parkersburg, WV (US); Sundar Kilnagar Venkataraman, Avondale, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 377 days.

(21) Appl. No.: 11/601,364

(22) Filed: Nov. 16, 2006

(65) Prior Publication Data

US 2007/0117935 A1     May 24, 2007

Related U.S. Application Data

(60) Provisional application No. 60/737,897, filed on Nov. 18, 2005.

(51) Int. Cl.
    *C08L 27/18*      (2006.01)
    *C08L 27/12*      (2006.01)
    *C08F 259/08*     (2006.01)
    *C08F 214/26*     (2006.01)

(52) U.S. Cl. ............... 525/199; 525/200; 525/276; 525/326.2; 524/520; 524/544; 524/545; 524/546

(58) Field of Classification Search ............... 525/276, 525/199, 200, 326.2; 524/520, 544, 545, 524/546

See application file for complete search history.

(56) References Cited

U.S. PATENT DOCUMENTS

| | | | |
|---|---|---|---|
| 2,685,707 A | 8/1954 | Llewellyn et al. | |
| 3,142,665 A | 7/1964 | Cardinal et al. | |
| 3,654,210 A | 4/1972 | Kuhls et al. | |
| 3,819,594 A | 6/1974 | Holmes et al. | |
| 4,036,802 A | 7/1977 | Poirier | |
| 4,380,618 A | 4/1983 | Khan et al. | |
| 4,391,940 A * | 7/1983 | Kuhls et al. | 524/458 |
| 4,722,122 A | 2/1988 | Overbay | |
| 4,908,410 A | 3/1990 | Malhotra | |
| 4,952,630 A | 8/1990 | Morgan et al. | |
| 5,494,752 A * | 2/1996 | Shimizu et al. | 428/407 |
| 5,677,404 A | 10/1997 | Blair | |
| 5,708,131 A | 1/1998 | Morgan | |
| 5,780,552 A * | 7/1998 | Kerbow | 525/276 |
| 5,932,673 A | 8/1999 | Aten et al. | |
| 6,429,258 B1 | 8/2002 | Morgan et al. | |
| 6,462,109 B1 * | 10/2002 | Sharma et al. | 523/501 |
| 6,583,226 B1 * | 6/2003 | Kaulbach et al. | 525/199 |
| 6,780,363 B2 * | 8/2004 | Palamone et al. | 264/219 |
| 6,841,594 B2 | 1/2005 | Jones et al. | |
| 6,870,020 B2 | 3/2005 | Aten et al. | |
| 7,414,084 B2 * | 8/2008 | Yamaguchi et al. | 523/201 |
| 7,462,667 B2 * | 12/2008 | Dadalas et al. | 524/544 |
| 2003/0073796 A1 | 4/2003 | Baillie | |
| 2003/0176515 A1 * | 9/2003 | Curtin et al. | 521/28 |
| 2004/0214974 A1 * | 10/2004 | Aten | 526/253 |
| 2004/0242783 A1 | 12/2004 | Yabu et al. | |
| 2005/0187328 A1 | 8/2005 | Globus et al. | |
| 2005/0222319 A1 | 10/2005 | Baillie | |

FOREIGN PATENT DOCUMENTS

| | | |
|---|---|---|
| EP | 0 829 494 A2 | 3/1998 |
| EP | 1 174 448 A1 | 1/2002 |
| WO | WO 03/059992 A1 | 7/2003 |
| WO | WO 03/062291 A1 | 7/2003 |

OTHER PUBLICATIONS

Tervoort et al. Macromolecules, 2000, 33, 6460-6465.*
Cogswell, F. N., "Polymer Melt Rheology, A Guide for Industrial Practice", Published by Woodhead Publishing, 1996, p. 31.

\* cited by examiner

*Primary Examiner*—Vasu Jagannathan
*Assistant Examiner*—Mark S Kaucher

(57) ABSTRACT

Core/shell polymer is provided wherein the core comprises non-melt flowable PTFE and the shell comprises melt-fabricable perfluoropolymer, the core/shell polymer providing a thixotropic melt blend and improved physical properties as compared to the melt-fabricable perfluoropolymer by itself.

22 Claims, No Drawings

MELT-FABRICABLE CORE/SHELL PERFLUOROPOLYMER

BACKGROUND OF THE INVENTION

1. Field of the Invention

This invention relates to perfluoropolymer core/shell polymer.

2. Description of related Art

It has become desirable to provide melt-fabricable perfluoropolymer with higher fluidity at the melt-fabrication temperature so as to increase the production rate for the desired molded article, e.g. to increase extrusion rate for primary insulation or cable jacket for communications cable. The development of high fluidity perfluoropolymer has been accompanied by changes in perfluoropolymer composition such that the physical properties of the perfluoropolymer remain satisfactory. For convenience, melt fluidity is often referred to as Melt Flow Rate (MFR) which is in units of grams of polymer that will flow in 10 min from the Plastometer® of ASTM D 1238-94a under a specified load at a specified temperature established by the ASTM test for the particular perfluoropolymer involved. The higher the MFR, the higher is the fluidity of the perfluoropolymer. When fluidity is expressed in terms of melt viscosity, the higher the MFR, the lower is the melt viscosity. While the high MFR perfluoropolymer has enabled higher production rates to be achieved, the disadvantage has arisen that the high MFR perfluoropolymer is also more flowable (fluid) when exposed to high temperatures such as may be encountered in a fire in a building in which articles such as insulated/jacketed plenum cable are used. The result of this increased fluidity is that the perfluoropolymer melts and drips, the drips causing the creation of smoke, which is prohibited by the building code NFPA-255.

US2005/0187328 A1 discloses the addition of a substantial amount of inorganic char-forming agent together with a small amount of hydrocarbon polymer to counteract the deterioration of the physical properties that would be observed if the blend were only perfluoropolymer plus char-forming agent. While the resultant three-component blend is both non-flammable and non-smoking enough as plenum cable jacket to pass the NFPA-255 burn test, such jacket composition contains a substantial amount of non-perfluoropolymer, i.e. char-forming agent and hydrocarbon polymer, which can be a disadvantage in certain applications.

The problem is how to obtain a perfluoropolymer which possesses both a high melt flow rate, for ease of melt-fabrication, such as by extrusion or injection molding, and which also resists dripping (melt flow), when exposed to heat such as from a building fire.

BRIEF SUMMARY OF THE INVENTION

The present invention solves this problem by providing a novel combination of non-melt flowable polytetrafluoroethylene (PTFE) and melt-fabricable perfluoropolymer. Thus, the present invention in one aspect is a core/shell polymer, the core of said polymer comprising non-melt flowable polytetrafluoroethylene and the shell of said polymer comprising melt-fabricable perfluoropolymer, said core/shell polymer being melt-fabricable, by the perfluoropolymer present in the shell being an effective amount to impart this property to the core/shell polymer. The proportion of melt-fabricable perfluoropolymer present as the shell is also preferably an effective amount for the melt-mixed blend of said core/shell polymer to be provided with a continuous phase (matrix) of the melt-fabricable perfluoropolymer, with the polytetrafluoroethylene core as particles (domains) being dispersed therein.

The core/shell polymer of the present invention is particulate, and upon melt mixing, this particulate nature becomes the dispersion just described. The core/shell polymer preferably contains at least about 0.1 wt % of non-melt flowable polytetrafluoroethylene as the core and can contain much greater percentages of the PTFE core, e.g. at least 30 wt % or at least 40 wt %, or even at least 50 wt % thereof, all core/shell polymer wt % disclosed herein being based on the combined weight of said non-melt flowable polytetrafluoroethylene of the core and said melt-fabricable perfluoropolymer of the shell. Core/shell polymer of the present invention exhibits advantageous melt flow properties and physical properties up to about 65 wt % PTFE and even up to about 75 wt %, based on the combined weight of the PTFE of the core and perfluoropolymer of the shell. The core/shell polymer embodiment disclosed in Examples 50B and 50C exhibits advantageous properties, especially at core contents of at least 50 wt % and even at much higher core contents, e.g. about 95 wt % core in the core/shell polymer. As the core content increases from about 75 wt % for the embodiment of Examples 50B and 50C, it becomes less certain that melt mixing of the core/shell polymer results in the dispersion of the core in a matrix of shell melt-fabricable perfluoropolymer. Articles molded from the core/shell polymer at core contents up to about 75 wt % are transparent to translucent, rather than opaque as are articles molded from PTFE, confirming that the PTFE is present as the dispersed phase.

The melt-fabricability characterizing both the core/shell polymer and the shell perfluoropolymer means that they are sufficiently flowable in the molten state that they can be fabricated by melt processing that involves subjecting the polymer to shear, such as extrusion and injection molding, to produce products having sufficient strength so as to be useful. One attribute of this strength is the ability to repeatedly flex film made from the melt blend of the core/shell polymer, without the film cracking or breaking. In this regard, the core/shell polymer preferably exhibits an MIT Flex Life of at least 500 cycles, more preferably, at least 1000 cycles still more preferably at least 2000 cycles, and most preferably about 4000 cycles. One attribute of melt flowability, enabling melt fabricability, is that the core/shell polymer of the present invention exhibits a melt viscosity of preferably no more than about $5 \times 10^5$ Pa·s, more preferably, no more than about $1 \times 10^5$ Pa·s, and most preferably, no more than about $5 \times 10^4$ Pa·s, all at a shear rate of 100 $s^{-1}$ and melt temperature in the range of about 350° C. to 400° C. The determination of melt viscosities disclosed herein, unless otherwise indicated, is by dividing shear stress applied to the polymer melt by shear rate applied to the polymer melt as disclosed on p. 31 of F. N. Cogswell, *Polymer Melt Rheology, A Guide for Industrial Practice*, published by Woodhead Publishing (1996). As a practical matter, the equivalent melt viscosities are obtained simply from the computer readout accompanying the rheometer used to determine shear rate and shear stress.

Thus, the core/shell polymer of the present invention is useful in the melt-fabrication processes already in use for the melt-fabricable perfluoropolymer by itself.

The non-melt flowability of the PTFE core means that the PTFE has such a high melt viscosity that it does not flow in the molten state and therefore cannot be mixed, in the molten state. Thus, the PTFE of the core cannot by itself be fabricated by the typical melt fabrication methods of extrusion and injection molding, which involve both shear and melt flow. Instead, this PTFE is well known to be fabricated by non-melt flow operations such as paste extrusion of a PTFE/organic lubricant mixture at a temperature typically between 15° C. and 150° C., followed by sintering to coalesce the PTFE particles into the molded article as disclosed in U.S. Pat. No. 2,685,707.

The present invention in another aspect involves the process comprising melt blending the core/shell polymer described above to obtain a dispersion of said PTFE in a matrix of said melt-fabricable perfluoropolymer. In the course of melt mixing the particles of core/shell polymer together, the PTFE becomes the dispersed phase and the melt-fabricable perfluoropolymer becomes the continuous phase of the resultant melt blend. The continuous phase being melt flowable perfluoropolymer is confirmed by the melt fabricability of the melt mixed composition.

Surprisingly, even though the PTFE core is non-melt flowable, it imparts unexpected flow properties to the melt blend formed from the core/shell polymer. Instead of permanently increasing melt viscosity of the melt blend, such core imparts thixotropy to the molten mass. Thus, as the shear rate applied to the melt blend increases, the viscosity of the melt blend decreases. This enables the core/shell polymer to be melt fabricated even though it may contain a substantial proportion of non-melt flowable PTFE. Preferably, the melt blend comprising the core/shell polymer exhibits thixotropy characterized by a reduction in viscosity of the melt upon increasing the shear rate from about 10 s$^-$to about 100 s$^{-1}$ that is at least about 10% greater than the reduction in viscosity at these same shear rates for the melt-fabricable perfluoropolymer by itself, as determined by the capillary rheometer method described later herein. Another surprising melt blend property is the increase in critical shear rate of the melt blend as compared to the melt-fabricable perfluoropolymer of comparable MFR by itself, which is indicative of increased extrudability and injection moldability, resulting in increased production rate. Critical shear rate is the extrusion rate at which the surface of the extrudate loses smoothness to become roughened in appearance, ranging from a sharkskin appearance to gross melt fracture. Preferably, the core/shell polymer of the present invention provides a melt blend that exhibits a critical shear rate at least about 10% greater than the critical shear rate of the melt-fabricable perfluoropolymer by itself. These melt properties of the core/shell polymer of the present invention lead to improved production rates and/or the melt fabrication of intricately shaped articles not heretofore obtainable by practical means.

The thixotropic nature of the melt blends also benefits the use of articles melt-fabricated from the melt blends. They have low-to-no melt flow (high melt viscosity) essentially in the absence of shear, i.e. only under the influence of the shear exerted by gravity. Thus, upon exposure of such articles to building fire, wherein the article of core/shell polymer blend may be above the melting point of the core/shell polymer (blend), the tendency to drip and cause smoke is considerably less than for articles made from the melt-fabricable perfluoropolymer by itself. As compared to the perfluoropolymer/char-forming agent/hydrocarbon polymer compositions of US 2005/0187328 A1, articles melt-fabricated from melt blends of the core/shell polymer of the present invention require little to no additive to prevent dripping when molten.

Articles melt fabricated from melt blends comprising the core/shell polymer of the present invention also exhibit surprising physical properties as will be discussed hereinafter.

DETAILED DESCRIPTION OF THE INVENTION

With respect to the composition of the core/shell polymer of the present invention, the non-melt flowability of the PTFE can also be characterized by high melt creep viscosity, sometimes called specific melt viscosity, which involves the measurement of the rate of elongation of a molten sliver of PTFE under a known tensile stress for 30 min, as further described in and determined in accordance with U.S. Pat. No. 6,841,594, referring to the specific melt viscosity measurement procedure of U.S. Pat. No. 3,819,594. In this test, the molten sliver made in accordance with the test procedure is maintained under load for 30 min, before the measurement of melt creep viscosity is begun, and this measurement is then made during the next 30 min of applied load. The PTFE preferably has a melt creep viscosity of at least about $1\times10^6$ Pa·s, more preferably at least about $1\times10^7$ Pa·s, and most preferably at least about $1\times10^8$ Pa·s, all at 380° C. This temperature is well above the first and second melt temperatures of PTFE of 343° C. and 327° C., respectively. The difference between non-melt flowability of the PTFE core and the melt flowability of the melt-fabricable perfluoropolymer shell is apparent from the melt flow rate (MFR) test procedure of ASTM D 1238-94a. In this procedure, the MFR is the rate in g/10 min that perfluoropolymer that flows through a defined orifice under a specified load at a specified temperature, usually 372° C. in 10 min. The PTFE used as the core in the present invention has no (zero) MFR, The high melt creep viscosity of the PTFE present in the core of the core/shell polymer also means that the PTFE is sinterable, i.e. a molded article, unsupported by the mold (free-standing), of the PTFE can be heated above the melting point of the PTFE to coalesce (sinter) the PTFE particles together without the molded article flowing to lose its shape. The PTFE used in the present invention is also often characterized by standard specific gravity (SSG), which is the ratio of weight in air of a PTFE specimen prepared in a specified manner to an equal volume of water at 23° C. as further described in U.S. Pat. No. 4,036,802 and ASTM D 4894-94. The lower the SSG, the higher the molecular weight of the PTFE. The specimen preparation procedure as disclosed in ASTM D4894-94 includes compression molding the test specimen, removing the compression molded test specimen from the mold, and sintering the specimen in air, i.e. free standing, at 380° C. The non-melt flowability of the PTFE enables this sintering to be carried out without the test specimen losing its compression molded shape and dimensions.

The PTFE can be the granular type or the fine powder type, made by suspension or aqueous dispersion polymerization, respectively. The PTFE can be homopolymer of tetrafluoroethylene or a copolymer thereof with a small amount of comonomer, such as hexafluoropropylene or perfluoro(alkyl vinyl ether) (PAVE) wherein the alkyl group can be linear or branched and contains 1 to 5 carbon atoms, that improves the sinterability of the TFE, to obtain such improvement as reduced permeability and greater flex life, as compared to the TFE homopolymer. The modifier in the core can be the same or different from the perfluoromonomer copolymerized with TFE to form the melt-fabricable shell. For example, the modifier in the core can be a PAVE comonomer and the perfluoromonomer in the shell can be a different PAVE comonomer or perfluoroolefin such as HFP. The comonomer-modified PTFE is sometimes referred to as modified PTFE. Examples of modified PTFE are disclosed in U.S. Pat. Nos. 3,142,665, 3,819,594, and 6,870,020 and this modified PTFE can be used as the core of the core/shell polymer of the present invention. The '665 and '594 patents disclose the very small modifier contents in the PTFE, within the range of 0.05 to 0.3 wt %, and the '020 patent discloses higher modifier contents of about 0.5 to 10 wt %. Examples 50B and 50C disclose surprising results at core contents of at least 50 wt % when the modifier content of the PTFE core is high. For simplicity and because the modified PTFE exhibits the same non-melt flow, high melt creep viscosity of PTFE homopolymer, this type of PTFE is included in the term polytetrafluoroethylene or PTFE used herein.

The non-melt flowable PTFE used in the present invention is to be distinguished from low molecular weight PTFE, which because of its low molecular weight has melt flowability but not melt-fabricability. This melt flowable PTFE, which has an MFR that is measurable by ASTM D 1238-94a, is obtained by direct polymerization under conditions that prevent very long polymer chains from forming, or by irradiation degradation of non-melt flowable PTFE. Such melt flowable PTFE is commonly called PTFE micropowder. It is not considered as being melt fabricable because the article molded from the melt is useless, by virtue of extreme brittleness. Because of its low molecular weight (relative to non-melt-flowable PTFE), it has no strength. An extruded filament of the PTFE micropowder is so brittle that it breaks upon flexing.

With respect to the perfluoropolymer shell, as indicated by the prefix "per" in perfluoropolymer, the monovalent atoms bonded to the carbon atoms making up the polymer are all fluorine atoms. Other atoms may be present in the polymer end groups, i.e. the groups that terminate the polymer chain. The perfluoropolymer is a perfluoroplastic, not a perfluoroelastomer.

The melt flow rate (MFR) of the perfluoropolymers used in the present invention can vary widely, depending on the proportion of core PTFE, the melt-fabrication technique desired for the core/shell polymer, and the properties desired in the melt-fabricated article. Thus, MFRs for the melt-fabricable perfluoropolymer can be in the range of about 0.1 to 500 g/10 min, but will usually be preferred as about 0.5 to 100 g/10 min, and more preferably 0.5 to 50 g/10 min as measured according to ASTM D-1238-94a and following the detailed conditions disclosed in U.S. Pat. No. 4,952,630, at the temperature which is standard for the resin (see for example ASTM D 2116-91a and ASTM D 3307-93 that are applicable to the most common melt-fabricable fluoropolymers, both specifying 372° C. as the resin melt temperature in the Plastometer®). The amount of polymer extruded from the Plastometer® in a measured amount of time is reported in units of g/10 min in accordance with Table 2 of ASTM D 1238-94a. The MFR of the perfluoropolymer in the shell is determined by carrying out the polymerization of the perfluoromonomers used to form the perfluoropolymer by themselves, i.e. no core, using the same recipe and polymerization conditions used to form the shell, to obtain perfluoropolymer that can be used in the MFR determination. The higher the MFR of the perfluoropolymer, the greater is the tendency to generate smoke when the polymer is subjected to the NFPA-255 burn test, thus failing such test. The shell can have high MFR, e.g. greater than 20 g/10 min, without the article melt-fabricated from the core/shell polymer of the present invention failing the NFPA-255 burn test, because the presence of the PTFE core as dispersed particles in the continuous phase of melt-fabricable perfluoropolymer making up the molded article ensures that the article does not flow under low shear, i.e. gravity, and thus, does not drip to cause smoke generation.

Another aspect of the present invention is the melt fabricability of the core/shall polymer even when it exhibits an MFR of 0 (zero), i.e. there is no flow of the polymer in 10 min when measured by ASTM D 1238-94a at the temperature that is standard for the resin. Despite zero MFR, the core/shell polymer of the present invention is melt fabricable because of the thixotropy exhibited by the polymer when it is subjected to the higher shear associated with melt fabrication.

Examples of perfluoropolymers that can be used in the shell of the polymer of the present invention include the copolymers of tetrafluoroethylene (TFE) with one or more polymerizable perfluorinated comonomers, such as perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers include perfluoro (methyl vinyl ether) (PMVE), perfluoro(ethyl vinyl ether) (PEVE), perfluoro(propyl vinyl ether) (PPVE), and perfluoro (butyl vinyl ether) (PBVE). The copolymer can be made using several PAVE monomers, such as the TFE/perfluoro (methyl vinyl ether)/perfluoro(propyl vinyl ether) copolymer, sometimes called MFA by the manufacturer. The preferred perfluoropolymers are TFE/HFP copolymer in which the HFP content is about 5-17 wt %, more preferably TFE/HFP/PAVE such as PEVE or PPVE, wherein the HFP content is about 5-17 wt % and the PAVE content, preferably PEVE, is about 0.2 to 4 wt %, the balance being TFE, to total 100 wt % for the copolymer. The TFE/HFP copolymers, whether or not a third comonomer is present, are commonly known as FEP. TFE/PAVE copolymers, generally known as PFA, have at least about 2 wt % PAVE, including when the PAVE is PPVE or PEVE, and will typically contain about 2-15 wt % PAVE. When PAVE includes PMVE, the composition is about 0.5-13 wt % perfluoro(methyl vinyl ether) and about 0.5 to 3 wt % PPVE, the remainder to total 100 wt % being TFE, and as stated above, may be referred to as MFA. The low melt viscosity of these copolymers relative to the high melt creep viscosity of the PTFE, provides the melt flowability to the perfluoropolymer composition for its melt fabricability, and the perfluoropolymer composition itself provides the strength required for the practical utility of the article melt fabricated from the perfluoropolymer. The melt flow difference between the melt-fabricable perfluoropolymer being characterizable by melt viscosity and MFR and the non-melt flowable PTFE being characterizable by melt creep viscosity and SSG is great as indicated by the inability of the melt-fabricable perfluoropolymer to be characterizable by melt creep viscosity or by SSG. The melt-fabricable perfluoropolymer cannot be characterized by either melt creep viscosity or by SSG. In the melt creep viscosity test, the sliver of molten perfluoropolymer melts, flows, and breaks during the 30 min initial heating under load at 380° C., so there is no sliver remaining for the melt creep determination during the second 30 min of heating. In the SSG test, the specimen melts and flows during the 380° C. heating (sintering for non-melt flowable PTFE), undermining the integrity of the specimen for the SSG determination. Of course, the non-melt flowability of the PTFE used in the present invention, enables the melt creep viscosity and SSG determinations to be made on such PTFE. The non-melt flowability of the PTFE core can also be characterized by zero MFR, i.e. no melt flow through the capillary in 10 min. Since PTFE is not thixotropic, this zero MFR is different from the zero MFR for the thixotropic core/shell polymer of the present invention.

The shell perfluoropolymer composition is determined by infrared analysis on compression molded film made from the core/shell polymer particles in accordance with the procedures disclosed in U.S. Pat. No. 4,380,618 for the particular fluoromonomers (HFP and PPVE) disclosed therein. The analysis procedure for other fluoromonomers are disclosed in the literature on polymers containing such other fluoromonomers. For example, the infrared analysis for PEVE is disclosed in U.S. Pat. No. 5,677,404. The perfluoropolymer shell is made to have a composition that is predictable from copolymerization recipe to make the perfluoropolymer by itself.

The perfluoropolymer composition of the core/shell polymers of the present invention, however, is determined on the entire core/shell polymer. The composition of the shell is calculated by subtracting the weight of the TFE consumed to make the PTFE core. The perfluoromonomer content other than TFE of the core/shell polymer is preferably at least 1.5 wt % based on the total weight of the TFE and perfluoromonomer in the core/shell polymer. When the PTFE in the core is homopolymer, the perfluoromonomer other than TFE will be concentrated in the shell. When the PTFE in the core is modified PTFE, then the perfluoromonomer will be present in both the core and the shell, the relative amounts depending on the wt % core in the core/shell polymer as well as upon the compositions of the core and shell.

The combination of the non-melt flowable PTFE core and melt fabricable perfluoropolymer shell of the polymer of the present invention results in a core/shell polymer that is also melt fabricable. Although the presence of the non-melt flowable PTFE core may lower the MFR of the overall polymer as compared to the MFR of the perfluoropolymer shell, and may even render the MFR not measurable by ASTM D 1238-94a, the thixotropy (shear thinning) exhibited by the polymer when subjected to sufficient shear in the molten state enables the resultant melt blend to be melt fabricated. This effect extends over the entire range of core/shell compositions. At least about 0.1 wt % PTFE core is required before the thixotropic effect is appreciable, although the preferred minimum amount of PTFE core is at least about 0.5 wt %, based on the combined weight of the PTFE of the core and the melt-fabricable perfluoropolymer of the shell, for greater melt viscosity reduction. The maximum amount of PTFE core is preferably up to that amount that enables the core to be the dispersed phase when the core/shell polymer is melt blended, such as occurs in extrusion or injection molding. Preferably the reduction in viscosity is at least about 100%, and more preferably at least about 500% greater than the viscosity reduction for the perfluoropolymer by itself when the shear rate is increased from about 10 s$^{-1}$ to about 100 s$^{-1}$. These shear rates are expressed in terms of "about", because of limitations in the operation of the rheometer used to measure them. The rheometer includes a variable speed piston that provides the volumetric flow rate (Q) of molten polymer through the rheometer orifice and various orifice sizes, the selection of which provides the radius r in the equation: shear rate $(\gamma)=4Q/\pi r^3$. With particular rheometers it may be difficult to adjust the piston speed and orifice size such that the exact shear rates of 10 s$^{-1}$ and 100 s$^{-1}$ are obtained. The shear rates used in the Examples were 11.9 s$^{-1}$ and 101 s$^{-1}$. Typically, the rheometer can be operated so that the shear rates are 10 s$^{-1}$±3 s$^{-1}$ and 100 s$^{-1}$±5 s$^{-1}$. In absolute terms, the preferred reduction in melt viscosity by the core/shell polymer of the present invention is at least about 200 Pa·s, more preferably at least about 400 Pa·s at the shear rates specified above.

The advantage of thixotropy discovered by the present invention extends to higher shear rates than 100 s$^{-1}$ enabling the core/shell polymer to be extruded at a faster rate by melt-draw down extrusion than the melt-fabricable perfluoropolymer by itself. Alternatively, the melt cone formed in melt-draw-down extrusion can have a lower draw-down ratio (DDR) than the usual DDR of 80 to 100:1, to improve concentricity of the wall thickness of the extrudate, applied for example as jacketing on FEP insulated communications cable, especially such cable used in plenums of buildings. DDR is the ratio of the cross-sectional area of the annular die opening to the cross-sectional area of the final shape and size of the extrudate, e.g. the plenum cable jacket just described.

Within the above composition range, various improvements in physical properties exist. Preferably, the non-melt flowable polytetrafluoroethylene content is about 4 to 50 wt % based on the combined weight of the non-melt flowable polytetrafluoroethylene and melt-fabricable perfluoropolymer. As the PTFE core wt % increases from 2 wt % based on the combined weight of the core and shell of the core/shell polymer, the elongation and tensile strength increase, indicating reinforcement of the perfluoropolymer continuous phase by the dispersed core particles. This reinforcement extends to much greater amounts of PTFE core, e.g. up to 20 wt % PTFE core, more preferably up to 30 wt % PTFE core, and most preferably up to at least 40 wt % PTFE core, 4 wt % PTFE core being the preferred minimum, all percents being based on the combined weight of the core and shell of the core/shell polymer. Alternatively, either the perfluoropolymer shell composition or its MFR can be adjusted to optimize melt flow either for high production rate melt fabrication or the production of intricate molded shapes, while still retaining adequate physical properties for the particular utility intended. For example, the elongation at break of core/shell polymer is preferably at least 200% for core/shell compositions containing up to at least 30 wt % PTFE core, preferably at least 40 wt %, based on the combined weight of core and shell. Example 50A-7 exhibits this high elongation for core/shell compositions up to about 75 wt %. The embodiment disclosed in Example 50B and 50C provides surprising properties when the core content is at least 50 wt %, and even at least 75 wt % and the core is highly modified PTFE instead of PTFE homopolymer.

The process of melt blending the core/shell polymer of the present invention can also be described by the advantageous property results, e.g. the melt blend exhibiting thixotropy characterized by at least about 10%, at least about 100%, or at least about 5000% reductions in melt viscosity when the shear rate is increased from 10 s$^{-1}$ to 100 $^{-1}$ by the capillary rheometer method. Alternatively or in combination with this thixotropy, the core/shell polymer preferably exhibits an elongation of at least about 200% up to at least 30 wt % of the core/shell polymer being the PTFE core, more preferably, at least 40 wt % of the core/shell polymer being the PTFE core. The present invention also contemplates the product of the melt blending processes disclosed herein. The resultant melt blend and articles molded therefrom can also have the structure described above, wherein the PTFE core is dispersed in continuous phase of the perfluoropolymer from the shell of the core/shell polymer.

The core/shell polymer of the present invention can be made by aqueous dispersion polymerization. In one embodiment, the non-melt flowable PTFE core is prepared in a polymerization that is separate from the polymerization forming the shell melt-fabricable perfluoropolymer, and this core is used to seed the polymerization of the perfluoromonomer forming the melt-fabricable perfluoropolymer shell onto the core. In another embodiment, the core is formed in situ, followed by polymerization to form the shell on the core. In this embodiment, the non-melt flowable PTFE core is formed by polymerization of TFE. Then the TFE (and initiator) feed to the polymerization reactor is stopped. The polymerization reaction is allowed to complete itself, and the transition to the copolymerization to form the shell polymer will depend on the copolymerization system being used. For example, the TFE remaining in the reactor can be permitted either to be consumed by the PTFE polymerization or to be vented off, and in either case, the copolymerization system for the shell polymer is then established. Alternatively, the copolymerization system for the shell polymer is established while maintaining the TFE concentration in the reactor constant. Then the copolymerization to form the shell is started. Addition of the comonomer along with additional TFE to the reactor will depend on the comonomer. When the comonomer is HFP, the total amount will typically be added at the commencement of the copolymerization reaction. When the comonomer is PAVE, it too may be added at the commencement of the copolymerization reaction or co-fed to the reactor with the TFE feed to the copolymerization reaction. Agitation of the aqueous medium and initiator addition may be stopped when the initial charge of comonomer is fed to the reactor to avoid premature coagulation of the PTFE core. The copolymerization to form the shell is carried out to obtain the relative amount of shell polymer desired and particle size of the core/shell polymer.

The core/shell polymer is preferably formed by first forming the core in situ, followed by the copolymerization to form the shell. This provides a better integration of the shell with the core, by chemical bonding between the core and the shell, wherein the shell copolymer acts as a compatibilizing agent with other melt-fabricable perfluoropolymer (from other core/shell polymer particles or from independently supplied melt-fabricable perfluoropolymer), generally enabling the matrix, i.e. the continuous phase, of the blend to be formed during melt mixing and the PTFE core particles to become dispersed without causing disruptions within the matrix that would detract from physical properties.

The polymerization to form the non-melt flowable PTFE core, whether by seed polymerization, by suspension or aqueous dispersion polymerization or in situ is conventional polymerization to form the non-melt flowable PTFE. The polymerization to form the shell is also conventional aqueous dispersion polymerization. Examples of initiators used in both polymerizations include ammonium persulfate, potassium persulfate, bis(perfluoroalkane carboxylic acid) peroxide, azo compounds, permanganate system, and disuccinic acid peroxide. Examples of dispersing agents used in the aqueous dispersion polymerizations include ammonium perfluorooctanoic and perfluoroalkyl ethane sulfonic acid salts, such as the ammonium salt.

A typical aqueous dispersion polymerization process as known in the art involves the steps of precharging an aqueous medium to a stirred autoclave, deoxygenating, pressurizing with TFE to a predetermined level, adding modifying comonomer if desired, agitating, bringing the system to desired temperature, e.g., 60°-100° C., introducing initiator, adding more TFE according to predetermined basis, and regulating temperature. Initiator addition, at the same or different rate, may continue throughout the batch or only for part of the batch. Recipe and operating parameters not fixed by the equipment are commonly selected in order that temperature is maintained approximately constant throughout the polymerization. This same general procedure is followed for polymerizing the perfluoromonomers to make the melt-fabricable perfluoropolymer, except that the polymerization temperature and order of addition of the TFE and the other perfluoromonomer will depend on the identity of the additional perfluoromonomer. Examples of general procedures for making melt-fabricable perfluoropolymer are disclosed in U.S. Pat. No. 5,677,404 (FEP) and U.S. Pat. No. 5,932,673 (PFA). The transition between the polymerization to make the core and the polymerization to make the shell can be varied as will be shown in the Examples herein. The timing of the transition is set in order to obtain the weight proportion of PTFE core desired in the core shell polymer. The weight % core can be determined by comparing the weight of TFE consumed in the polymerization of the core with the weight of perfluoromonomers, e.g. TFE plus HFP or perfluoro(alkyl vinyl ether) consumed in the polymerization of the shell.

The particle size of the core/shell polymer is small enough that the polymer particles remain dispersed in the aqueous medium until the polymerization reaction is completed, whereupon the dispersed core/shell polymer particles can be intentionally coagulated, by such conventional means as increased agitation from the agitation applied during polymerization or by addition of electrolyte. Alternatively, the coagulation can be done by freeze/thaw method such as disclosed in U.S. Pat. No. 5,708,131 (Morgan).

Typically, the average as-polymerized core/shell polymer particle size (diameter), referred to as RDPS (raw dispersion particle size) in the Examples, will be less than one micrometer (submicrometer-size) as determined by the laser light scattering method of ASTM D4464. Preferably the average core/shell polymer particle size is less than about 0.5 micrometer, more preferably less than about 0.3 micrometer, and even more preferably, less than about 0.25 micrometer and most preferably less than about 0.2 micrometer. The smaller the average core/shell polymer particle size, the more stable the aqueous dispersion of the polymer particles, enabling the polymerization to be carried out to higher polymer solids content before stopping the polymerization and carrying out coagulation. The average particle size of the core of the core/shell polymer will vary with overall size of the core/shell polymer and the weight proportion of the core desired and will in any event, be smaller than the particle size of the core/shell polymer particles. Thus, since the core/shell polymer particles are on average submicrometer-size, so will the core particles be submicrometer-size when the core/shell polymer particles are melt-mixed to form the continuous phase of melt-fabricable perfluoropolymer with the core PTFE particles dispersed therein. Similarly, for each of the core/shell polymer average particle sizes cited above, the core particles will be smaller. Thus, for the average core/shell polymer particle size of less than about 0.3 micrometer, the average particle size of the core therein will also be less than about 0.3 micrometers. The particle size of the core in the core/shell polymer incorporated into the melt blend is understood to be the size of the particles of PTFE in the melt blend and articles melt-fabricated from the melt blend, because of the non-melt flowability of the PTFE.

The as-polymerized core/shell polymer particle sizes described above are the primary particles (sizes) of the polymer. Coagulation of the aqueous dispersion of the core/shell primary particles causes these particles to agglomerate together, and upon drying to become a fine powder having an average particle size depending on the method of coagulation, but of at least about 300 micrometers, as determined by the dry-sieve analysis disclosed in U.S. Pat. No. 4,722,122. The agglomerates of primary particles and thus the particles of the fine powder are often referred as secondary particles.

Thus, the core/shell polymer particles of the present invention can be provided in several forms, as primary particles and as secondary particles. When these particles are melt-mixed (blended), the core/shall polymer loses its particulate form to become a blend of the two polymers, notably wherein the core is the dispersed phase and the melt-fabricable perfluoropolymer is the continuous phase. The melt blending can be part of the melt fabrication process, such as occurs during extrusion or injection molding. Typically, the melt blend will be extruded as molding pellets, which can later be used for melt fabrication into the final article. In all these melt blend forms, the core is present as the dispersed phase in the continuous phase of melt-fabricable perfluoropolymer. The melt blending or melt fabrication process, which includes the melt blending, is typically carried out at a temperature above the melting temperature of the polytetrafluoroethylene, whether the first melting temperature (about 343° C.) or the second melt temperature, i.e. when the polymer is melted again after it is first melted (sometimes called the "first heat") (about 327° C.), whereby the core/shell polymer becomes molten. Thus, the melt mixing temperature will typically be at least about 350° C. When the core content is at least about 75 wt % as demonstrated in Examples 50B and 50C, a melt-mixed structure other than dispersion of the core in the shell polymer matrix may result.

The core/shell polymer of the present invention can be prepared as a concentrate, i.e. of relatively high PTFE content for dilution with separately supplied melt-fabricable perfluoropolymer by itself. Separately supplied melt fabricable perfluoropolymer is perfluoropolymer that is not supplied by the core/shell polymer. The resultant melt blend causes the melt-fabricable perfluoropolymer from the shell of the core/shell polymer to melt mix with the separately supplied melt-fabricable perfluoropolymer to become indistinguishable as they form together the continuous phase for the dispersed particles of non-melt flowable polytetrafluoroethylene. Preferably the dilution of the core/shell polymer with additional (independently supplied) melt-fabricable perfluoropolymer involves the mixing together of aqueous dispersions of each polymer, followed by co-coagulation of the intermixed dispersion, resulting in an intimate mixing of the primary particles of the polymer from each dispersion with one another. This provides the best overall results for the viscosity of the melt blend in melt mixing accompanying melt fabrication and for the physical properties of articles molded from the blend. Co-coagulation of the mixed dispersions results in the formation of agglomerates, which contain both primary particles of core/shell polymer and separately supplied melt-fabricable perfluoropolymer. The particle sizes of these primary particles and agglomerates (fine powder when dried) are the same as disclosed above with respect to the core/shell polymer particles and agglomerates thereof by themselves. The independently supplied melt-fabricable perfluoropolymer should be compatible with the perfluoropolymer of the shell of the core/shell polymer. By compatible is meant that the melt-fabricable perfluoropolymers become indistinguishable in melt mixing and cooling in forming the continuous phase as described above. Preferably the monomers making up the melt-fabricable perfluoropolymer of the shell and the independently supplied perfluoropolymer are either the same or in the homologous series. The shell polymer and the independently supplied perfluoropolymer are considered to be the same even there may be small difference in concentration of the same perfluoromonomer and/or difference in MFR as occurs from small differences in the polymerization process producing the shell polymer as compared to producing the perfluoropolymer by itself. This provides the indistinguishability of the shell perfluoropolymer and independently supplied perfluoropolymer resulting from melt mixing to form the continuous phase of the blend. The most common melt-fabricable perfluoropolymers, FEP and PFA are incompatible with one another, one indicia of which is that magnified frozen (that is non-molten) cross-sections of the cooled melt blend reveal domains of each perfluoropolymer being present when viewed under polarized light.

In this embodiment, in which the core/shell polymer is a concentrate, the core/shell polymer by itself can be melt-fabricable by itself. Alternatively, the core/shell polymer can have little-to-no melt-fabricability by virtue of very high PTFE core content, e.g. at least 97 wt %. In this embodiment, the melt-fabricability of the blend of core/shell polymer and separate melt-fabricable perfluoropolymer is enabled by the latter, and the combination of the melt-fabricable perfluoropolymer from the shell of the core/shell polymer and the perfluoropolymer supplied by itself provides the continuous phase of the melt-mixed blend.

In the embodiment wherein the core/shell polymer is a concentrate, the proportions of core/shell polymer and independently supplied perfluoropolymer are chosen to provide in melt blend combination any of the core/shell compositions described above.

In addition to the core/shell polymer of the present invention being subjected to melt blending (mixing), the core/shell polymer can also be fabricated by another melt process which involves little to no melt mixing, namely compression molding. The resultant compression molded article is formed either from the core/shell polymer or of a melt-mixed blend of core/shell polymer. The core/shell polymer particles or agglomerates of these particles can be added to a compression mold, and then conventional compression molding is carried out such as disclosed in the Test Procedures at the beginning of the Examples. Alternatively, the core/shell polymer can be extruded into pellets, wherein the core/shell polymer losses its core/shell identity, and the pellets are added to the compression mold. Thus, the compression molding is formed directly or indirectly from the core/shell polymer.

EXAMPLES

Test Procedures

The procedures for determining melt creep viscosity, standard specific gravity (SSG), melt flow rate (MFR), core/shell polymer composition, and average core/shell polymer particle size (RDPS) reported in the Examples are disclosed earlier herein. The determination of melt viscosity is also disclosed earlier herein. All of the core/shell polymers disclosed in the Examples exhibited a melt viscosity less than about $5\times10^4$ Pa·s at 350° C. and shear rate of 101 s$^{-1}$.

The thixotropy of the melt blends disclosed herein and described in the Examples is determined by capillary rheometry method of ASTM D 3835-02 in which the melt temperature of the polymer in the rheometer is 350° C. This method involves the extrusion of molten polymer through the barrel of a Kayeness® capillary rheometer at a controlled force to obtain the shear rate desired. The results are reported in the Examples as melt viscosity change (reduction or difference), $\Delta\eta$, in Pa·s in increasing the shear rate on the molten polymer from 11.9 s$^{-1}$ to 101 s$^{-1}$. The determination of melt viscosity using the rheometer has been discussed hereinbefore. The melt viscosities are determined at the two shear rates, and the viscosity difference is determined by subtracting the melt viscosity at 101 s$^{-1}$ from the melt viscosity at 11.9 s$^{-1}$.

The elongation at break and tensile strength are determined by the procedure of ASTM D 638-03 on dumbbell-shaped test specimens 15 mm wide by 38 mm long and having a web thickness of 5 mm, stamped out from 60 mil (1.5 mm) thick compression molded plaques. The disclosures of elongation and tensile strength parameters and values herein are with reference to and are obtained by following this procedure using the compression molded plaques, unless otherwise indicated.

The procedure for measuring MIT Flex Life is disclosed at ASTM D 2176 using a 8 mil (0.21 mm) thick compression molded film. The disclosures of the MIT Flex Life parameter and values herein are with reference to and are obtained using a 0.21 mm thick compression molded film, unless otherwise indicated.

The compression molding of the plaques and film used in these tests was carried out on fine powder under a force of 20,000 lbs (9070 kg) at a temperature of 350° C. to make 6×6 in (15.2×15.2 cm) compression moldings. In greater detail, to make the 60 mil thick plaque, the fine powder was added in an overflow amount to a chase which was 55 mil (1.4 mm) thick. The chase defines the 6×6 in sample size. To avoid sticking to the platens of the compression molding press, the chase and fine powder filling are sandwiched between two sheets of aluminum foil. The press platens are heated to 350° C. This sandwich is first pressed for 5 min at about 200 lb (91 kg) to melt the fine powder and cause it to coalesce, followed by pressing at 10,000 lb (4535 kg) for 2 min, followed by 20000 lb (9070 kg) for 2 min, followed by release of the pressing force, removal of the compression molding from the chase and sheets of aluminum foil, and cooling in air under a weight to prevent warping of the plaque. The film used in the MIT test used the same procedure except that the chase was 8 mil (0.21 mm) thick and defined a 4×4 in. (10.2×10.2 cm) square cavity. The film samples used in the MIT test were ½ in (1.27 cm) thick strips cut from the compression molded film. Compression molding of the core/shell polymer coagulated and dried into fine powder produces the dispersion of the PTFE core in a continuous matrix of the shell perfluoropolymer. The compression molding is necessary to give the test specimen strength. If the powder were merely coalesced by heating at the temperature of the compression molding, to simulate the fusing of a coating, the resultant coalesced article would have little strength.

Comparative Example A

This Example shows the polymerization to form a typical high-performing FEP by itself for comparison with Examples preparing core/shell polymer in which FEP is the shell.

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water and 330 mL of a 20 wt % solution of ammonium perfluorooctanoate surfactant in water. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., HFP was added slowly to the reactor until the pressure was 444 psig (3.1 MPa). Ninety-two milliliters of liquid PEVE was injected into the reactor. Then TFE was added to the reactor to achieve a final pressure of 645 psig (4.52 MPa). Then 40 mL of freshly prepared aqueous initiator solution containing 1.04 wt % of ammonium persulfate (APS) and 0.94 wt % potassium persulfate (KPS) was charged into the reactor. Then, this same initiator solution was pumped into the reactor at 10 mL/min for the remainder of the polymerization. After polymerization had begun as indicated by a 10 psig (70 kPa) drop in reactor pressure, additional TFE was added to the reactor at a rate of 24.5 lb (11.1 kg)/125 min until a total of 24.5 lbs (11.1 kg) of TFE had been added to the reactor after kickoff. Furthermore, liquid PEVE was added at a rate of 1.0 mL/min for the duration of the reaction. The total reaction time was 125 min after initiation of polymerization. At the end of the reaction period, the TFE feed, PEVE feed, and the initiator feed were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. Solids content of the dispersion was 36.81 wt % and raw dispersion particle size (RDPS) was 0.167 µm. After coagulation, the polymer was isolated by filtering and then drying in a 150° C. convection air oven. This polymer was stabilized by heating at 260° C. for 1.5 hr in humid air containing 13 mol % water. The TFE/HFP/PEVE terpolymer (FEP) had a melt flow rate (MFR) of 37.4 g/10 min, an HFP content of 10.5 wt %, a PEVE content of 1.26 wt %, and a melting point of 260° C. For this material, the viscosity change (reduction), $\Delta\eta$, is 101 Pa·s. The FEP exhibited a tensile strength and elongation at break of 2971 psi (20.8 MPa) and 310%, respectively.

Example 1

Core/shell polymer when the shell polymer is FEP and the proportion of core to shell is widely varied, is made in this Example. A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water and 330 mL of a 20 wt % solution of ammonium perfluorooctanoate surfactant in water. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., the pressure of the reactor was raised to 250 psig (1.75 MPa) using TFE. Fifty milliliters of an initiator solution consisting of 1.04 wt % APS and 0.94 wt % KPS in water was injected to the reactor, then this same initiator was added at 0.5 mL/min. After polymerization had begun as indicated by a 10 psig (70 kPa) drop in reactor pressure, additional TFE was added at 0.2 lb (90.7 g)/min for 10 min. After 2 lbs (9070 g) of TFE had been fed after polymerization began, the TFE feed was stopped, then the reactor contents were agitated for 10 minutes with the initiator still being fed. The agitator and initiator pumps were stopped, then 1280 mL of HFP were added to the reactor. Agitation was resumed and initiation was resumed using the same solution at a rate of 10 mL/min. The reactor pressure was raised to 600 psi (4.1 MPa) with TFE. An aliquot of 92 mL of PEVE was added to the reactor, then 1 mL/min PEVE and 0.2 lb (90.87 g)/min TFE were added over the remainder of the reaction. After an additional 20 lb (9070 g) of TFE were reacted, the PEVE injection was stopped. Two lbs (907 g) more of TFE were fed, for a total of 24 lb (10.9 kg) TFE for the batch, then the batch was terminated in a manner similar to Comparative Example A. Solids content of the dispersion of the resultant TFE/HFP/PEVE copolymer was 35.8 wt % and raw dispersion particle size (RDPS) was 0.246 µm. The polymer was finished in a manner similar to Comparative Example A. Details of the composition of this core/shell polymer and its properties are presented as Example 1 in Table 1.

Examples 2-6

Examples 2 through 6 were prepared in a manner similar to Example 1, with the proportions of core and shell altered by changing the relative amounts of TFE fed during each phase of polymerization. Details are given in Table 1 below.

TABLE 1

| Ex. No. | PTFE Core, wt % | HFP Content, wt % | PEVE Content, wt % | HFP Content in Shell, wt % | PEVE Content in Shell, wt % | MFR, g/10 min | Tensile Strength, MPa | Elongation at Break, % | $\Delta\eta$, Pa·s |
|---|---|---|---|---|---|---|---|---|---|
| 1 | 7.6% | 6.84 | 1.37 | 7.41 | 1.48 | 0 | 26.7 | 357 | 12936 |
| 2 | 11.5% | 6.42 | 1.43 | 7.25 | 1.62 | 0.4 | 23.8 | 393 | 6273 |
| 3 | 15.4% | 6.41 | 1.47 | 7.57 | 1.74 | 0.7 | 21.3 | 358 | 6495 |
| 4 | 19.2% | 6.18 | 1.69 | 7.65 | 2.09 | 0 | 24.9 | 394 | 9000 |
| 5 | 26.9% | 5.83 | 1.81 | 7.98 | 2.48 | 0 | 20.9 | 338 | 9113 |
| 6 | 39.0% | 5.08 | 1.30 | 8.34 | 2.12 | 0 | 17.3 | 235 | 10344 |

Each of the polymerizations was carried out to a solids content of 33.8 to 35.8 wt % and the RDPS of the polymer particles ranged from 194 to 261 nm (0.194 to 0.261 micrometers). As compared to the reduction in melt viscosity of 101 Pa·s for typical FEP by itself (Comparison Example A), the core/shell polymer of the present invention exhibits a much greater melt viscosity reduction with increasing shear, with the maximum reduction occurring at the lowest core content tested. This thixotropy enables the core/shell polymer, which exhibits very low MFR, to be melt fabricated when subjected to the higher shear applied in the melt fabrication process. With respect to physical properties, the tensile strength and elongation at break of the core/shell polymer was better than for the FEP by itself at PTFE core contents up to about 30 wt %, and useful tensile strength and elongation at break exist for core contents exceeding core content of about 40 wt %. The best combination of optimum thixotropy and physical properties occur in the range of about 4 to 20 wt % PTFE core when the perfluoropolymer in the shell is FEP. The low-to-no MFR shown for the core/shell polymers in Table 1 is beneficial to the utility of articles melt-fabricated from the core/shell polymers. Such articles (dispersion of PTFE core in perfluoropolymer continuous phase obtained by melt mixing the core/shell polymer) when exposed to high heat such as in a building fire will resist flowing and dripping to thereby remain non-smoking.

Comparative Example B

This Example shows the polymerization of PTFE by itself essentially under the same conditions used for polymerizing TFE to make the non-melt flowable PTFE in the core/shell polymer of Examples 1-6 above and in the Examples to follow to verify that the PTFE is non-melt flowable.

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water, 330 mL of a 20 wt % solution of ammonium perfluorooctanoate surfactant in water, and 1.0 g Krytox® 157 FSL, available from E.I. du Pont de Nemours and Company, Inc. Krytox® 157 FSL is a perfluoropolyether carboxylic acid as further described in Table 1 of U.S. Pat. No. 6,429,258. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., the pressure of the reactor was raised to 250 psig (1.75 MPa) using TFE. Fifty milliliters of an initiating solution consisting of 1.04 wt % APS and 0.94 wt % KPS in water was injected to the reactor, then this same initiator was added at 0.5 mL/min. After polymerization had begun as indicated by a 10 psig (0.07 MPa) drop in reactor pressure, additional TFE was added at 0.2 lb (90.8 g)/min for 7.5 min. After 1.5 lbs (681 g) of TFE had been fed after initiation, the TFE and initiator feeds were stopped and the reactor was vented. The contents of the reactor were cooled to 80° C. before being discharged. Solids content of the dispersion was 4.78 wt % and raw dispersion particle size (RDPS) was 0.089 μm. After coagulation, the polymer was isolated by filtering and then dried in a 150° C. convection air oven. The standard specific gravity (SSG) of the resulting PTFE homopolymer, measured according to the method described in U.S. Pat. No. 4,036,802, was determined to be 2.200. The results demonstrate that the core is non-melt flowable PTFE because it has a measurable SSG. The PTFE also exhibits a melt creep viscosity greater than $10^8$ Pa·s at 380° C.

Examples 7-11

This Example shows core/shell polymer with approximately the same core content and with varying HFP and PEVE content for the overall core/shell polymer and for the shell FEP.

PTFE dispersions were polymerized in the manner of Comparative Example B, varying the amount of Krytox® 157 FSL used as shown in Table 2. Rather than venting the reaction vessel, however, the TFE feed was stopped, then the contents of the reactor were stirred for 10 min with continuing initiator feed. After 10 min, the initiator feed was stopped, then the reactor pressure was raised to 444 psig (3.1 MPa) with HFP. A 92 mL aliquot of PEVE was injected, then TFE was added to the reactor to a pressure of 650 psig (4.6 MPa). For the remainder of the batch, an initiator solution of 1.04 wt % APS and 0.94 wt % KPS was added at a rate of 10 mL/min, while PEVE was added at 1.0 mL/min. TFE was added at 0.2 lb (90.7 g)/min for 97.5 min. After an additional 19.5 lbs (8845 g) of TFE were added, the TFE, initiator, and PEVE feeds were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. After coagulation, the polymer was isolated by filtering and then drying in a 150° C. convection air oven. This polymer was stabilized by heating at 260° C. for 1.5 hr in humid air containing 13 mol % water. Properties of these polymers are shown in Table 2.

TABLE 2

| Ex. No. | Krytox® 157FSL Used, g | PTFE Core, wt % | HFP Content, wt % | PEVE Content, wt % | HFP Content in Shell, wt % | PEVE Content in Shell, wt % | MFR, g/10 min | Tensile Strength, MPa | Elongation at Break, % | Δη, Pa·s |
|---|---|---|---|---|---|---|---|---|---|---|
| 7  | 0 | 6.5% | 6.96  | 1.82 | 7.44  | 1.95 | 8.4  | 22.1 | 329 | 2197 |
| 8  | 1 | 6.4% | 8.56  | 1.59 | 9.14  | 1.70 | 7.6  | 21.4 | 316 | 2079 |
| 9  | 2 | 6.4% | 9.18  | 1.31 | 9.81  | 1.40 | 5.8  | 18.0 | 207 | 1710 |
| 10 | 4 | 6.2% | 11.26 | 1.43 | 12.01 | 1.53 | 17.0 | 21.2 | 312 | 1202 |
| 11 | 5 | 6.4% | 9.44  | 1.31 | 10.08 | 1.40 | 9.5  | 22.6 | 323 | 1800 |

The polymerizations shown in Table 2 were carried out to solids concentrations of 36.2 to 38.7 wt % polymer solids, and the average RDPS of the core/shell polymer was from 76 to 191 nm. As shown in Table 2, both the MFR and melt viscosity as well as physical properties of the core/shell polymer can be changed by changing the shell compositions, using the same TFE, HFP and PEVE comonomers.

Examples 12-14

This Example shows the effect of increasing polymerization initiator concentration in the polymerization to form the FEP shell so as to further increase MFR.

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water, 330 mL of a 20 wt % solution of ammonium perfluorooctanoate surfactant in water, and 5.0 g Krytox® 157 FSL. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., the pressure of the reactor was raised to 250 psig (1.75 MPa) using TFE. Fifty milliliters of an initiating solution, consisting of 1.04 wt % APS and 0.94 wt % KPS in water was injected to the reactor, then this same initiator was added at 0.5 mL/min. After polymerization had begun as indicated by a 10 psig (0.07 MPa) drop in reactor pressure, additional TFE was added at 0.2 lb (90.8 g)/min for 10 min. After 1.5 lbs (681 g) of TFE fed after initiation, the TFE feed was stopped, then the reactor contents were agitated for 10 minutes with the initiator still being fed. The agitator and initiator pumps were stopped, then the pressure of the reactor was raised to 444 psig (3.1 MPa) with HFP. Agitation was restarted and initiation was resumed at a rate of 10 mL/min using a solution as shown in Table 3. The reactor pressure was raised to 650 psi (4.55 MPa) with TFE. An aliquot of 92 mL of PEVE was added to the reactor, then 1 mL/min PEVE and 0.2 lb (90.7 g)/min TFE were added over the remainder of the reaction. After an additional 19.5 lbs (8845 g) of TFE were added, the TFE, initiator, and PEVE feeds were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. After coagulation, the polymer was isolated by filtering and then drying in a 150° C. convection air oven. This polymer was stabilized by heating at 260° C. for 1.5 hr in humid air containing 13 mol% water. The properties of these polymers are shown in Table 3.

TABLE 3

| Ex. No. | Shell Initiator Solution APS Conc., wt % | Shell Initiator Solution KPS Conc., wt % | PTFE Core, wt % | HFP Content, wt % | PEVE Content, wt % | HFP Content in Shell, wt % | PEVE Content in Shell, wt % | MFR, g/10 min | Tensile Strength, MPa | Elongation at Break, % | Δη, Pa·s |
|---|---|---|---|---|---|---|---|---|---|---|---|
| 12 | 1.04 | 0.94 | 6.4% | 9.41  | 1.32 | 10.05 | 1.41 | 9.8  | 22.2 | 269 | 2194 |
| 13 | 2.08 | 1.88 | 6.3% | 11.17 | 1.23 | 11.92 | 1.31 | 20.9 | 19.5 | 320 | 1060 |
| 14 | 2.08 | 1.88 | 6.2% | 11.59 | 1.35 | 12.35 | 1.44 | 28.0 | 17.3 | 274 | 627  |

The polymerizations shown in this Table produced polymer solids contents of 38.2 to 39.3 wt % for the aqueous dispersion polymerization medium, and average RDPS of 142 to 230 nm.

Examples 15-19

This Example shows the preparation of the core/shell polymer using ammonium persulfate as the sole initiator, and changing the initiator concentration at almost constant core content to vary the MFR of the core/shell polymer.

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water, 330 mL of a 20 wt % solution of ammonium perfluorooctanoate surfactant in water, and 5.0 g Krytox® 157 FSL. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., the pressure of the reactor was raised to 250 psig (1.75 MPa) using TFE. Fifty milliliters of an initiating solution consisting of 1.834 wt % APS in water was injected to the reactor, then this same initiator was added at 0.5 mL/min. After polymerization had begun as indicated by a 10 psig (0.07 MPa) drop in reactor pressure, additional TFE was added at 0.2 lb (90.8 g)/min for 10 min. After 1.5 lbs (681 g) of TFE fed after initiation, the TFE feed was stopped, then the reactor contents were agitated for 10 minutes with the initiator still being fed. The initiator pump was stopped, then the pressure of the reactor was raised to 444 psig (3.1 MPa) with HFP. Initiation was resumed using a solution as shown in Table 4 at a rate of 10 mL/min. The reactor pressure was raised to 650 psi (4.55 MPa) with TFE. An aliquot of 92 mL of PEVE was added to the reactor, then 1 mL/min PEVE and 0.2 lb (90.8 g)/min TFE were added over the remainder of the reaction. After an additional 19.5 lbs (8853 g) of TFE were added, the TFE, initiator, and PEVE feeds were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. After coagulation, the polymer was isolated by filtering and then drying in a 150° C. convection air oven. The properties of these polymers are shown in Table 4.

duration of the batch, 120 min. At the end of the reaction period, the TFE, PEVE, and initiator feeds were stopped and the reaction vessel was vented. Solids content of the dispersion was 29.7 wt %, and the raw dispersion particle size (RDPS) was 0.172 μm. After coagulation, the polymer was isolated by filtering and then dried in a 150° C. convection air oven. This PEVE/TFE copolymer had a melt flow rate (MFR) of 29.0 g/10 min, a PEVE content of 3.01 wt %, a melting point of 302° C., and an MIT flex life of 2463 cycles. The viscosity change was 111 Pa·s. The copolymer also exhibited a tensile strength of 3027 psi (21.2 MPa) and elongation at break of 349%.

Example 20

This Example shows the preparation of core shell polymer in which the shell is essentially the same PFA as Comparative Example C.

A cylindrical, horizontal, water-jacketed, paddle-stirred, stainless steel reactor having a length to diameter ratio of about 1.5 and a water capacity of 10 gallons (37.9 L) was

TABLE 4

| Ex. No. | Shell Initiator Solution APS Conc., wt % | PTFE Core, wt % | HFP Content, wt % | PEVE Content, wt % | HFP Content in Shell, wt % | PEVE Content in Shell, wt % | MFR, g/10 min | Tensile Strength, MPa | Elongation at Break, % | Δη, Pa · s |
|---|---|---|---|---|---|---|---|---|---|---|
| 15 | 1.89 | 6.32% | 10.47 | 1.00 | 11.17 | 1.07 | 10.8 | 22.8 | 327 | 1005 |
| 16 | 2.37 | 6.21% | 11.86 | 1.14 | 12.64 | 1.21 | 18.2 | 20.8 | 323 | 1093 |
| 17 | 2.84 | 6.25% | 11.41 | 1.06 | 12.18 | 1.13 | 15.2 | 18.1 | 320 | 1168 |
| 18 | 3.31 | 6.19% | 12.33 | 0.95 | 13.14 | 1.01 | 27.4 | 16.1 | 206 | 1170 |
| 19 | 3.79 | 6.17% | 12.72 | 0.97 | 13.55 | 1.04 | 30.7 | 16.3 | 181 | 871 |

The polymerizations carried out for the Examples in Table 4 resulted in polymer solids contents ranging from 30.9 to 39.5 wt % and average RDPS of 100 to 184 nm.

Comparative Example C

This Example shows the copolymerization to make a typical high-performing PFA by itself for comparison with the core/shell polymer containing essentially the same PFA.

A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water and 240 mL 20 wt % solution of ammonium perfluorooctanoate surfactant in water. With the reactor paddle agitated at 50 rpm, the reactor was evacuated and purged three times with tetrafluoroethylene (TFE). Ethane was added to the reactor until the pressure was 8 in Hg (3.93 psig, 2.71×10$^{-2}$ MPa), then 200 mL of perfluoro(ethyl vinyl ether) (PEVE) were added. The reactor temperature then was increased to 75° C. After the temperature had become steady at 75° C., TFE was added to the reactor to achieve a final pressure of 300 psig (2.07 MPa). An aliquot of 400 mL of a freshly prepared aqueous initiator solution containing 0.2 wt % of ammonium persulfate (APS) was charged to the reactor. This same initiator solution was pumped into the reactor at 5 mL/min for the remainder of the batch. After polymerization had begun, as indicated by a 10 psig (0.07 MPa) drop in reactor pressure, additional TFE was added to the reactor at a rate of 0.167 lb/min (75.6 g/min) until a total of 20 lb (9080 g) of TFE were added after kickoff. PEVE was added at 2.0 mL/min for the charged with 54 pounds (24.5 kg) of demineralized water and 240 mL of a 20 wt % solution of ammonium perfluorooctanoate surfactant in water. With the reactor paddle agitated at 50 rpm, the reactor was evacuated and purged three times with tetrafluoroethylene (TFE). The reactor temperature then was increased to 75° C. After the temperature had become steady at 75° C., the pressure of the reactor was raised to 300 psig (2.1 MPa) using TFE. Four hundred milliliters of an initiating solution consisting of 0.2 wt % APS in water was injected to the reactor, then this same initiator was added at 5.0 mL/min. After polymerization had begun as indicated by a 10 psig (0.07 MPa) drop in reactor pressure, additional TFE was added at 0.2 lb (90.8 g)/min for 5 min. After 1 lb (454 g) of TFE was fed after initiation, the TFE and initiator feeds were stopped, then the reactor was slowly vented. After stopping agitation, the reactor vapor space was evacuated. Agitation was resumed at 50 rpm, then the contents were cooled to 25° C. The agitator was again stopped, then the pressure in the reactor was raised to 8 in Hg (3.93 psig, 2.71×10$^{-1}$ MPa) with ethane. After the addition of ethane, the agitator was restarted at 50 rpm and the contents of the reactor were warmed to 75° C. A 200 mL aliquot of perfluoro(ethyl vinyl ether) (PEVE) was added, then the pressure in the reactor was raised to 250 psig (1.75 MPa) with TFE (1.72 MPa). For the duration of the reaction, PEVE was added at 2 mL/min and initiation was resumed using the same solution at a rate of 5 mL/min. The pressure of TFE in the reactor was continuously adjusted to maintain a reaction rate of 0.167 lb TFE/min (75.7 g/min). After 19 lbs (8618 g) TFE reacted in 114 min, the reaction was terminated by stopping TFE, initiator, and PEVE feeds, then venting the reactor. Solids content of the dispersion was 26.3 wt %, and the raw dispersion particle size (RDPS) was 0.192 µm. After coagulation, the polymer was isolated by filtering and then dried in a 150° C. convection air oven. This core/shell polymer had a melt flow rate (MFR) of 8.6 g/10 min, a PEVE content of 2.99 wt %, melting points of 301° C. and 324° C., and an MIT flex life of 5384 cycles. The copolymer also exhibited a tensile strength of 3414 psi (23.5 MPa) and elongation at break of 392%. The PTFE core content was 4.9 wt %, and $\Delta\eta$ was 2051 Pa·s. These results are included in Table 5. According to these results, the core/shell polymer, exhibits a melt viscosity reduction of almost 20× of the PFA by itself and improved tensile strength and elongation at break.

Examples 21-24

Examples 21 through 24 were prepared as described in Example 20. The ratio of core polymer to shell polymer was altered by changing the ratio of the TFE consumed by the first phase of the polymerization and the TFE consumed by the second phase of the polymerization. Specific details for Examples 20-24 are given in Table 5 below.

TABLE 5

| Ex. No. | PTFE Core, wt % | PEVE Content, wt % | PEVE Content in Shell, wt % | MFR, g/10 min | Tensile Strength, MPa | Elongation at Break, % | MIT Flex Life, cycles | $\Delta\eta$ Pa·s |
|---|---|---|---|---|---|---|---|---|
| 20 | 4.9% | 2.99 | 3.15 | 8.6 | 23.9 | 392 | 5384 | 2051 |
| 21 | 9.7% | 2.70 | 3.00 | 2.3 | 25.8 | 392 | 22884 | 6772 |
| 22 | 19.5% | 2.41 | 2.99 | 0.0 | 27.0 | 397 | 48748 | 15834 |
| 23 | 29.4% | 1.86 | 2.64 | 0.0 | 26.6 | 411 | 14209 | 41128 |
| 24 | 39.6% | 1.12 | 1.85 | 0.0 | 28.3 | 396 | 3752 | 3500 |

The polymerizations shown in Table 5 were carried out to a polymer solids content of 18.4 to 28.5 wt % and average RDPS of 184 to 192 nm. The results in Table 5 show large reductions in melt viscosity over the entire range of core/shell polymer compositions and improved tensile strength and elongation also over the entire range. Also surprising is the increase in MIT Flex Life, ranging from an increase of at least about 150% to an increase more than 2000%. Preferably the core/shell polymer in which the shell is PFA exhibits an increase in MIT Flex Life of at least 200% as compared to the PFA by itself.

The PTFE/FEP core shell polymer also exhibited favorable MIT Flex Life as compared to the same FEP by itself (1100 cycles) through the range of 4 to 40 wt % PTFE core, i.e. the MIT flex life of the PTFE/FEP core shell polymer was about the same at 10 wt % PTFE core and above, while at lower PTFE content, a substantial improvement was been found to exist. For example, at 7 wt % PTFE core, the MIT Flex Life was 17000 cycles.

Comparative Example D

This Example shows the preparation of a different typical PFA by itself for comparison with core/shell polymer.

A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water, 5.0 g Krytox® 157 FSL (available from E.I. du Pont de Nemours and Co., Inc.), and 240 mL 20 wt % solution of ammonium perfluorooctanoate surfactant in water. With the reactor paddle agitated at 50 rpm, the reactor was evacuated and purged three times with tetrafluoroethylene (TFE). Ethane was added to the reactor until the pressure was 8 in Hg (3.93 psig, $2.71 \times 10^{-2}$ MPa), then 200 mL of perfluoro(propyl vinyl ether) (PPVE) were added. The reactor temperature then was increased to 75° C. After the temperature had become steady at 75° C., TFE was added to the reactor to achieve a final pressure of 250 psig (1.75 MPa). An aliquot of 400 mL of a freshly prepared aqueous initiator solution containing 0.2 wt % of ammonium persulfate (APS) was charged to the reactor. This same initiator solution was pumped into the reactor at 5 mL/min for the remainder of the batch. After polymerization had begun, as indicated by a 10 psig (0.07 MPa) drop in reactor pressure, additional TFE was added to the reactor at a rate of 0.167 lb/min (75.6 g/min) until a total of 20 lb (9080 g) of TFE were added after kickoff. PPVE was added at 2.0 mL/min for the duration of the batch, 120 min. At the end of the reaction period, the TFE, PPVE, and initiator feeds were stopped and the reaction vessel was vented. When the reactor pressure reached 5 psig (0.035 MPa), the reactor was swept with nitrogen, then the reactor contents were cooled to 50° C. before the dispersion was discharged from the reactor. Solids content of the dispersion was 28.9 wt %, and the raw dispersion particle size (RDPS) was 0.130 µm. After coagulation, the polymer was isolated by filtering and then dried in a 150° C. convection air oven. This TFE/PPVE copolymer had a melt flow rate (MFR) of 8.2 g/10 min, a PPVE content of 3.66 wt %, melting points of 232 and 328° C., and an MIT flex life of 78583 cycles. The tensile strength of the PFA was 3502 psi (24.5 MPa) and the elongation at break was 292%. The viscosity change was 2658 Pa·s.

Example 25

This Example shows the preparation of core/shell polymer in which the shell polymer is essentially the same as Comparison Example D.

A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water, 5 g Krytox® 157FSL, and 240 mL of a 20 wt % solution of ammonium perfluorooctanoate surfactant in water. With the reactor paddle agitated at 50 rpm, the reactor was evacuated and purged three times with tetrafluoroethylene (TFE). The reactor temperature then was increased to 75° C. After the temperature had become steady at 75° C., the pressure of the reactor was raised to 300 psig (2.1 MPa) using TFE. Four hundred milliliters of an initiating solution consisting of 0.2 wt % APS in water was injected to the reactor, then this same initiator was added at 5.0 mL/min. After polymerization had begun as indicated by a 10 psig (0.07 MPa) drop in reactor pressure, additional TFE was added at 0.2 lb (90.8 g)/min for 5 min. After 4 lb (1816 g) of TFE was fed after initiation, the TFE and initiator feeds were stopped, then the reactor was slowly vented. After stopping agitation, the reactor vapor space was evacuated. Agitation was resumed at 50 rpm, then the contents were cooled to 25° C. The agitator was again stopped, then the pressure in the reactor was raised to 8 in Hg (3.93 psig, $2.71 \times 10^{-2}$ MPa) with ethane. After the addition of ethane, the agitator was restarted at 50 rpm and the contents of the reactor were warmed to 75° C. A 200 mL aliquot of perfluoro(propyl vinyl ether) (PPVE) was added, then the pressure in the reactor was raised to 250 psig (1.75 MPa) with TFE. For the duration of the reaction, PPVE was added at 2 mL/min and initiation was resumed using the same solution at a rate of 5 mL/min. The pressure of TFE in the reactor was continuously adjusted to maintain a reaction rate of 0.167 lb TFE/min (75.7 g/min). After 16 lbs (8618 g) TFE reacted in 96 min, the reaction was terminated by stopping TFE, initiator, and PPVE feeds, then venting the reactor. Solids content of the dispersion was 29.3 wt %, and the raw dispersion particle size (RDPS) was 0.105 μm. After coagulation, the polymer was isolated by filtering and then dried in a 150° C. convection air oven. This core/shell polymer had no detectable melt flow rate (MFR) (0 g/10 min), a PPVE content of 3.42 wt %, melting points of 306 and 326° C., and an MIT flex life of 72502 cycles. The core shell polymer also exhibited a tensile strength of 4097 psi (28.7 MPa) and elongation at break of 370%. The PTFE core content was 19.3 wt %, and Δη was 19568 Pa·s. These results are included in Table 6.

Examples 26-45

Examples 26 through 45 were prepared as described in Example 25. The ratio of core polymer to shell polymer was altered by changing the ratio of TFE consumed by the first and second phases of the polymerization. Furthermore, the PPVE content in the polymer was varied systematically by changing both the amount of PPVE precharged to the reactor, as well as the rate at which it was added during polymerization. Specific details are given in Table 6 below.

The polymerizations of Table 6 were carried out to polymer solids contents of 29.3 to 31.3 wt %, and average RDPS of 95 to 145 nm, except that the core/shell polymer of example 45 had an average RDPS of 250 nm which limited the polymerization to a solids content of 16.9 wt %. For Examples 25 to 35, the amount of PPVE fed to the polymerization remained constant, with the result being that as the PTFE core content increased, the PEVE content of the overall core/shell polymer decreased. For Examples 36 to 45, the PPVE feed to the polymerization of the shell was increased as PTFE core content increased, to approximately keep the PPVE content of the overall core/shell polymer constant. This resulted in an increase in PPVE content for the shell as the PTFE core content increased. The results reported in Table 6 show that some of the core/shell polymers of Examples 25-35 exhibit either better physical properties or melt viscosity reduction or both than the corresponding core/shell polymer of Examples 36-45, while for other core/shell polymers, the corresponding ones in Examples 36-45 are better. Adjustment of the amount of comonomer with the TFE in the polymerization of the shell is another way to adjust the melt and physical properties of the core/shell polymer. The results reported in Table 6 also show melt viscosity reductions of more than 200% greater than the melt viscosity reduction obtained for the PFA by itself over the entire range of PTFE core contents. The tensile strengths and elongations at break for the core/shell polymer were also superior for the core/shell polymer.

Examples 20-45 show core/shell polymer compositions for PFA shell, wherein the PTFE core content ranges from about 4 to about 50 wt %, exhibiting one or more favorable properties of reduced melt viscosity with increased shear and high tensile strength and high elongation at break.

Example 46

This Example shows the use of core/shell polymer of the present invention as a concentrate, blended with melt-fabricable perfluoropolymer by itself.

A core/shell PFA containing 38.4 wt % PTFE core polymerized in the manner of Example 33 was coagulated by

TABLE 6

| Ex. No. | PPVE Precharge, mL | PPVE Addition Rate, mL/min | PTFE Core, wt % | PPVE Content, wt % | PPVE Content in Shell, wt % | MFR, g/10 min | Tensile Strength, MPa | Elongation at Break, % | MIT Flex Life, cycles | Δη, Pa·s |
|---|---|---|---|---|---|---|---|---|---|---|
| 25 | 200 | 2 | 19.3% | 3.42 | 4.24 | 0 | 28.7 | 370 | 72502 | 19568 |
| 26 | 200 | 2 | 4.8% | 3.96 | 4.16 | 2.0 | 25.8 | 315 | 309473 | 6756 |
| 27 | 200 | 2 | 9.6% | 3.70 | 4.09 | 0.6 | 28.1 | 366 | 116091 | 9468 |
| 28 | 200 | 2 | 14.4% | 3.75 | 4.39 | 0.2 | 28.1 | 358 | 154775 | 10144 |
| 29 | 200 | 2 | 19.3% | 3.48 | 4.32 | 0.0 | 28.6 | 386 | 92820 | 8996 |
| 30 | 200 | 2 | 24.2% | 3.26 | 4.29 | 0.0 | 26.3 | 340 | 169801 | 8393 |
| 31 | 200 | 2 | 29.0% | 3.30 | 4.65 | 0.1 | 27.3 | 383 | 57947 | 12542 |
| 32 | 200 | 2 | 33.9% | 3.10 | 4.69 | 0.0 | 26.9 | 353 | 91448 | 7259 |
| 33 | 200 | 2 | 38.8% | 2.89 | 4.73 | 0.0 | 21.2 | 419 | 48162 | 10561 |
| 34 | 200 | 2 | 43.7% | 2.93 | 5.21 | 0.0 | 28.8 | 422 | 13812 | 14735 |
| 35 | 200 | 2 | 48.7% | 2.66 | 5.18 | 0.0 | 29.1 | 415 | 7142 | 17139 |
| 36 | 211 | 2.1 | 4.8% | 4.59 | 4.82 | 2.0 | 28.4 | 338 | 395879 | 8505 |
| 37 | 222 | 2.2 | 9.6% | 3.80 | 4.21 | 0.7 | 28.9 | 351 | 254853 | 8815 |
| 38 | 234 | 2.4 | 14.4% | 4.25 | 4.96 | 0.3 | 28.8 | 344 | 478394 | 9854 |
| 39 | 250 | 2.5 | 19.1% | 4.74 | 5.86 | 0.2 | 28.7 | 363 | 116048 | 8058 |
| 40 | 267 | 2.7 | 23.9% | 4.50 | 5.91 | 0.0 | 29.3 | 363 | 94574 | 9956 |
| 41 | 286 | 2.9 | 28.6% | 4.57 | 6.40 | 0.0 | 30.5 | 368 | 130642 | 9403 |
| 42 | 308 | 3.1 | 33.3% | 4.99 | 7.47 | 0.0 | 29.9 | 387 | 90304 | 6362 |
| 43 | 333 | 3.3 | 38.2% | 4.58 | 7.40 | 0.0 | 29.2 | 395 | 33165 | 8244 |
| 44 | 364 | 3.6 | 42.6% | 5.31 | 9.26 | 0.0 | 27.2 | 365 | 21712 | 10761 |
| 45 | 400 | 4 | 48.5% | 3.00 | 5.83 | 0.0 | 25.3 | 354 | 127306 | 20049 | freezing, rinsed, and dried overnight at 150° C. One hundred fifty grams of this powder were dry-blended with 150 g of pellets (about 3.5 mm in diameter×about 3.5 mm in length) of a standard PFA in the manner of Comparative Example D. This standard PFA had an MFR of 13.5 g/10 min and a PPVE content of 4.3 wt %. The resulting blend was introduced to the mixing bowl of a 350 cm³-capacity Haake Rheomix® batch intensive mixer that had been preheated to 350° C. and was equipped with roller blades. The mixture was blended at 50 rpm for 5 min to effect complete melting and mixing of the two components. The tensile strength of the resulting blend is 2900 psi (20.3 MPa), elongation at break is 316%, the melt flow rate is 0 g/10 min, and the MIT Flex Life is 32,562 cycles. The viscosity reduction of this blend is 26,875 Pa·s. Comparison of these results with Example 29 shows that both the tensile strength and elongation of the blend diminished from blend made solely of the core/shell polymer, but that the thixotropy (reduction in melt viscosity on shearing) was much greater.

Example 47

This Example shows the use of core/shell FEP polymer of the present invention as a concentrate, blended with melt-fabricable perfluoropolymer by itself.

A core/shell FEP containing 38.6 wt % PTFE core was polymerized and finished in the manner of Example 7. Fifty grams of this powder were dry-blended with 250 g of pellets of a standard FEP (same dimensions as pellets of Example 46) in the manner of Comparative Example A. This standard FEP had an MFR of 30 g/10 min, an HFP content of 10.4 wt %, and a PEVE content of 1.2 wt %. The resulting blend was introduced to the mixing bowl of a 350 cm³-capacity Haake Rheomix® batch intensive mixer equipped with roller blades that had been preheated to 350° C. The mixture was blended at 50 rpm for 5 min to effect complete melting and mixing of the two components. The tensile strength of the resulting blend is 3087 psi (21.6 MPa), an elongation at break of 311%, a melt flow rate of 14.9 g/10 min, and an MIT Flex Life of 2459 cycles. The viscosity reduction of this blend is 1086 Pa·s, which is much greater than for the FEP of Example A by itself, without sacrifice in physical properties.

Comparative Example E

This example shows the preparation of a PTFE/FEP composition of matter by melt blending of PTFE fine powder and FEP powder via extrusion.

A dry blend composed of 7 wt % PTFE fine powder and the remainder a compacted FEP powder polymerized in the manner of Comparative Example A was prepared by tumbling. The agglomerated PTFE fine powder had an average particle size of 475 micrometers, a standard specific gravity (SSG) of 2.175, and an HFP content of 0.450 wt %. The compacted FEP powder had an average aggregate size (diameter) of approximately 6 mm, an MFR of 30, an HFP content of 10.2 wt %, and a PEVE content of 1.2 wt %. The resulting powder blend was fed at a rate of 25 lbs/hr (11.4 kg/hr) to a 28 mm twin screw extruder operating at 350° C. and 217 rpm. A general purpose screw configuration was utilized. The molten output from the 28 mm twin screw extruder was pumped directly to a 1½" single screw extruder equipped with a general metering screw. The single screw extruder operated at 350° C. and 22.1 rpm. The resulting strand was quenched in a trough of cold water, then cut into about 3 mm (length) pellets. This blend has a tensile strength of only 1070 psi (7.5 MPa), an elongation at break of 126%, MFR of 3.59 g/10 min. Comparison of these results with those of Example 11 reveals that the latter exhibits much better physical properties (tensile strength of 22.6 MPa and elongation of 323%), indicating the importance of the dispersion of submicrometer-size-size PTFE particles in the continuous phase of FEP, obtained by starting with submicrometer-size core/shell polymer particles in the melt blending process.

Comparative Example F

This example shows the preparation of a PTFE/FEP composition of matter by melt blending of PTFE fine powder and FEP pellets via extrusion.

A dry blend composed of 7 wt % PTFE fine powder and the remainder to total 100 wt % of FEP pellets polymerized in the manner of Comparative Example A was prepared by tumbling. The agglomerated PTFE fine powder had an average particle size of 475 micrometers, a standard specific gravity (SSG) of 2.175, and an HFP content of 0.450 wt %. The oblate spheroid FEP pellets were approximately 3.5 mm in diameter, and have an MFR of 30.5, an HFP content of 10.2 wt %, and a PEVE content of 1.2 wt %. The resulting blend was fed at a rate of 20 lbs/hr (9080 g/hr) to a 28 mm twin screw extruder operating at 350° C. and 217 rpm. A general purpose screw configuration was utilized. The molten output from the 28 mm twin screw extruder was pumped directly to a 1½' (3.8 cm) single screw extruder equipped with a general metering screw. The single screw extruder operated at 350° C. and 22.1 rpm. The resulting strand was quenched in a trough of cold water, then cut into about 3 mm pellets. This blend has a tensile strength of only 1121 psi (7.8 MPa), an elongation at break of 172%, an MFR of 15.1 g/10 min, and an MIT Flex Life of 2924 cycles. The viscosity change of this blend is 674 Pa·s. Similar to Comparative Example E, these properties are greatly inferior to those of Example 11.

Comparative Example G

This example shows the preparation of a PTFE/PFA composition of matter by melt blending of PTFE fine powder and PFA pellets via extrusion.

A dry blend composed of 20 wt % PTFE fine powder and the remainder PFA pellets polymerized in the manner of Comparative Example D was prepared by tumbling. The agglomerated PTFE fine powder had an average particle size of 475 micrometers, a standard specific gravity (SSG) of 2.175, and an HFP content of 0.450 wt %. These standard PFA pellets were oblate spheroids approximately 3.5 mm in diameter, and had an MFR of 13.5 g/10 min and a PPVE content of 4.3 wt %. The resulting blend was fed at a rate of 25 lbs/hr (11.4 kg) to a 28 mm twin screw extruder operating at 350° C. and 210 rpm. A general purpose screw configuration was utilized. The molten output from the 28 mm twin screw extruder was pumped directly to a 1½" (3.8 cm) single screw extruder equipped with a general metering screw. The single screw extruder operated at 350° C. and 21.5 rpm. The resulting strand was quenched in a trough of cold water, then cut into about 3 mm pellets. This blend has a tensile strength of 1121 psi (7.8 MPa), an elongation at break of 172%, an MFR of 4.1 g/10 min. These properties are greatly inferior to those of the core/shell compositional counterpart, Example 25, which exhibited tensile strength of 28.7 MPa and elongation of 370%.

Example 48

This Example shows the preparation of core/shell polymer containing a very small amount of non-melt flowable PTFE.

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water, 5.0 g Krytox® 157 FSL (available from E.I. du Pont de Nemours and Company, Inc.), and 330 mL of a 20 wt % solution of ammonium perfluorooctanoate surfactant in water. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., the pressure of the reactor was raised to 250 psig (1.75 MPa) using TFE. Fifty milliliters of an initiating solution consisting of 1.04 wt % APS and 0.94 wt % KPS in water was injected to the reactor, then this same initiator was added at 0.5 mL/min. After polymerization had begun as indicated by a 10 psig (70 kPa) drop in reactor pressure, additional TFE was added at 0.2 lb (90.7 g)/min for approximately 1 min. After 0.21 lbs (95.3 g) of TFE had been fed after initiation, the TFE feed was stopped, then the reactor contents were agitated for 10 minutes with the initiator still being fed. The agitator and initiator pumps were stopped, then the pressure of the polykettle was increased to 444 psig with HFP. The agitator was restarted and initiation was resumed using the same solution at a rate of 10 mL/min. The reactor pressure was raised to 650 psi (4.5 MPa) with TFE. An aliquot of 92 mL of PEVE was added to the reactor, then 1 mL/min PEVE and 0.2 lb (90.87 g)/min TFE were added over the remainder of the reaction. After an additional 20.79 lb (9430 g) of TFE were reacted, the TFE, initiator, and PEVE feeds were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. After coagulation, the polymer was isolated by filtering and then drying in a 150° C. convection air oven. This polymer was stabilized by heating at 260° C. for 1.5 hr in humid air containing 13 mol % water. Solids content of the dispersion of the resultant TFE/HFP/PEVE copolymer was 39.1 wt % and raw dispersion particle size (RDPS) was 0.113 µm. The PTFE core content of this core/shell polymer was 0.87 wt %, the HFP content was 12.2 wt % in the shell, and the PEVE content was 1.06 wt % in the shell, the remainder to total 100% by weight being TFE. This material had a tensile strength of 3650 psi (25.2 MPa), an elongation at break of 370%, a melt flow rate of 14.8 g/10 min, and a viscosity reduction, $\Delta\eta$, of 713 Pa·s, which is much greater than for the FEP of Comparative Example A. The viscosity change at about 0.1 wt % PTFE core is estimated to be about 100% greater than for the FEP by itself.

Example 49

This Example is directed to improved injection molding resulting from the use of core/shall polymer of the present invention.

PFA 1 used in this Example is a copolymer of tetrafluoroethylene (TFE) and perfluoro(propyl vinyl ether) (PPVE), with PPVE content of 4.1 wt %, and MFR of 29.2 g/10 min.

PFA 2 used in this Example is the same copolymer as PFA 1 except that the PPVE content of 4.2 wt %, and the MFR is 12.6 g /10 min.

State 1 is a core/shell polymer having 4.78 wt % polytetrafluoroethylene core and a PFA shell of composition like that of PFA 1. State 1 MFR is 8 g/10 min.

State 2 is a core/shell polymer having 4.81 wt % polytetrafluoroethylene (PTFE) core and a PFA shell of composition like that of PFA 2. State 2 has an MFR of 4 g/10 min.

All of these polymers were in the form of extruded/cut pellets. In the pellets of the state 1 and state 2 polymers, the core was present as dispersed submicrometer-size particles in a matrix of the PFA from the shell produced by melt blending the core/shell polymer in an extruder.

Test Procedures for this Example

Flex Life—The procedure for measuring MIT Flex Life is in accordance with ASTM D 2176, and the MIT Flex Life values reported in this Example were measured on a 50 mil (1.27 mm) thick film compression molded in the same way as disclosed under Test Procedures at the beginning of the Examples for the compression molding of 60 mil (1.5 mm) thick plaque, except that the thickness of the chase to mold the 1.27 mm thick film was 50 mils (1.27 mm) thick. Use of the thicker film (thicker than the 0.21 mm thick film in the preceding Examples) shortens the time required in the flex test, thereby resulting in much smaller MIT flex life numbers (cycles). The MIT Flex Life determined on the 1.27 mm thick film can be described as the 1.27 mm MIT Flex Life.

Injection Moldability—The "snake flow" test measures the flowability of polymer at shear rates typical of those used in injection molding. A molten polymer sample was injected into a mold having a rectangular channel 12.7 mm by 2.54 mm, the channel being serpentine in shape. The distance that injected polymer travels in the channel is an index of polymer melt flowability. For convenience, the weight of the polymer in the channel ("Shot Weight") is reported.

The equipment used was a Nissei Injection Molding Machine, Model FN-4000. Temperature profile: rear 350° C., Center 350° C.; Front 355° C.; Nozzle 360° C.; mold temperature 180° C.; injection pressures 80 MPa and 120 MPa.

Injection Molding

The core/shell polymers of the invention, State 1 and State 2 are compared with PFA 1 and PFA 2 at injection pressure of 80 MPa. State 2 and PFA 2 are also compared at 120 MPa. Tables 7 and 8 summarize the results for injection pressures of 80 MPa and 120 MPa respectively.

TABLE 7

Injection Pressure 80 MPa

| Polymer | PFA 1 | State 1 | PFA 2 | State 2 |
|---|---|---|---|---|
| MFR | 29.2 | 8 | 12.6 | 4 |
| Shot Wt. (g) | 9.6 | 9.0 | 6.0 | 4.5 |

TABLE 8

Injection Pressure 120 MPa

| Polymer | PFA 2 | State 2 |
|---|---|---|
| MFR | 12.6 | 4 |
| Shot Wt. (g) | 13.1 | 12.7 |

The results show that the core/shell polymers of the invention have melt flowability under injection molding conditions much higher than would be predicted from their low MFR, thus exhibiting the shear thinning (thixotropic) behavior of core/shell polymer of the present invention. One aspect of the importance of being able to obtain high shot weight with low MFR core/shell polymer is shown by the flex life test results.

The 1.27 mm MIT Flex Life was measured on State 1 and State 2 core/shell polymers of the invention and on PFA 1 and PFA 2. Results are summarized in Table 9.

TABLE 9

| Polymer | PFA 1 | State 1 | PFA 2 | State 2 |
|---|---|---|---|---|
| MFR | 29.2 | 8 | 12.6 | 4 |
| Flex Life (cycles) | 139 | 362 | 418[1] | 880 |

[1]The MIT flex life for 8 mil (0.21 mm) thick film of PFA 2 is about 15,000 cycles.

The flex life test results show that States 1 and 2 core/shell polymer, while behaving like polymers of much higher melt flow rate in melt processing, also behave like polymers of low melt flow rate by exhibiting high MIT Flex Life.

Example 50

This Example is directed to the embodiment wherein the core of the core/shell polymer is highly modified PTFE such as described in U. S. Pat. No. 6,870,020. The core/shell polymer of this embodiment exhibits surprisingly high MIT Flex Life, as the core content increases from 50 wt %. As will be shown in this Example, the MIT Flex Life of the core/shell polymer wherein the core is PTFE homopolymer, decreases as the core content increases from 50 wt %. In contrast, the MIT Flex Life when the core is highly modified PTFE, increases as the core content increase from 50 wt %. Among the melt-fabricable perfluoropolymers, PFA is known as a high MIT Flex Life polymer. The MIT Flex Life of PFA, however, is small relative to PTFE. For Example, the MIT Flex Life of PTFE homopolymer is typically at least 50 times that of PFA, and for the highly modified PTFE of U.S. Pat. No. 6,870,020, the difference is at least about 100 times that of PFA. The increase in MIT Flex Life for the core/shell polymer of the present invention when the core is highly modified can exceed the MIT Flex Life of PTFE homopolymer and approach that of the highly modified PTFE of the '020 patent. Thus, while the PFA used as the shell polymer in the core/shell polymer of the present invention will exhibit by itself a 1.27 mm MIT Flex Life of less than 1000 cycles, the core/shell polymer of this embodiment of the present invention preferably exhibits a 1.27 mm MIT Flex Life of at least 2500 cycles when the core content is at least 50 wt %. When the core content is at least 80 wt %, the 1.27 mm MIT Flex Life is preferably at least 5000 cycles. When the core content is at least 90 wt %, the 1.27 mm MIT Flex Life is preferably at least 7000 cycles. More preferably, the 1.27 mm MIT Flex Life for the core/shell polymer of this embodiment is at least 30,000 cycles and at least 90,000 cycles at core contents of at least 80 wt % and at least 90 wt %, respectively.

These MIT Flex Life values were obtained using a 50 mil (1.27 mm) thick film for flex testing as in Example 49 as compared to the 8 mil (0.21 mm) thick film used in the MIT Flex Life measurements reported in Examples 1-48 and in the Comparative Examples where MIT Flex Life is reported. The 1.27 mm MIT Flex Life gives a much smaller number (cycles) than the 0.21 mm MIT Flex Life as indicated by the footnote to Table 9.

The preferred amount of modifier used in this embodiment to obtain the increase in MIT Flex Life at core contents of at least 50 wt % is at least 1.5 wt % of modifier, based on the total weight of the modified PTFE, more preferably at least 2 wt %. The weight % of the core in the core/shell polymer can be determined by comparing the weight of the TFE plus modifier consumed in the polymerization of the core with the weight of the perfluoromonomers consumed in the polymerization of the shell. The weight % of modifier in the core can be determined by comparing the weight of modifier consumed in the polymerization of the core with the total weight of monomer consumed in the polymerization of the core. The maximum amount of modifier present in the core is established by the non-melt flowability of the core, e.g. the MFR of the core will be zero (g/10 min).

The preferred modifier is the fluorinated vinyl ether disclosed in '020, more preferably the perfluoro(alkyl vinyl ethers) wherein the alkyl group can be linear or branched and contains 1 to 5 carbon atoms.

The core of the core/shell polymer of this embodiment is non-melt flowable and yet sufficient melt-fabricable perfluoropolymer is present as the shell that the overall polymer is melt fabricable. The non-melt-flowability of the core can be characterized by zero melt flow rate (MFR) at 372° C. or by minimum melt creep viscosity of at least $1 \times 10^6$ Pa·s at 380° C. The core/shell polymer of this embodiment is also characterized by the same thixotropic behavior as disclosed hereinbefore for core/shell polymer of the present invention, notwithstanding that the core content can be quite high, e.g. at least 95 wt %. This thixotropic behavior is also a characteristic of the melt-fabricability of the core/shell polymer of this embodiment.

Another aspect of his embodiment of the present invention is the compression molded article either of the core/shell polymer of this embodiment or of a melt-mixed blend of this core/shell polymer. The core/shell polymer particles or agglomerates of these particles can be added to a compression mold, and then conventional compression molding is carried out such as disclosed in the Test Procedures at the beginning of the Examples. Alternatively, the core/shell polymer can be extruded into pellets, wherein the core/shell polymer loses its core/shell identity, and the pellets are added to the compression mold. Thus, the compression molding is formed directly or indirectly from the core/shell polymer. Another aspect of this embodiment is the melt-mixed blend comprising the core/shell polymer with the high modifier contents as described above, i.e. the blend obtained by melt mixing the core/shell polymer particles together. The simplest embodiment of this aspect is the melt mixing of the core/shall polymer, such as carried out in an extruder, at a temperature above the melting point of the core and shell polymers, wherein the core/shell polymer particles coalesce into the article molded, e.g. extruded, from the melt mixture. At the lower core contents, the zero MFR core forms the dispersed phase in the melt-mixed composition (blend). At higher core contents, e.g. about 75 wt % and greater, the existence of this dispersion/matrix structure, wherein the zero MFR core is the dispersed phase is less clear, as suggested by properties of the composition. It is possible for the core particles to touch and bond together, wherein the melt-fabricable perfluoropolymer shell then forms an interpenetrating network between portions of contacting cores.

The combination of extremely high MIT Flex Life together with melt-fabricability amounts to this embodiment of core/shell polymer of the present invention providing a melt-fabricable PTFE. In the following sections of this Example, the melt extrusion of core/shell polymer will be demonstrated to produce a PTFE-like polymer of extremely high MIT Flex Life. Properties such as high ejongation and tensile strength of extruded strand and/or of compression molded plaques will also be demonstrated.

Example 50 A

This Example shows the preparation of core/shell polymer in which the core is homopolymer PTFE and the shell is the melt processable PFA of Comparative Example C.

A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water and 240 mL of a 20 wt % solution of ammonium perfluorooctanoate surfactant in water. With the reactor paddle agitated at 50 rpm, the reactor was evacuated and purged three times with tetrafluoroethylene (TFE).

The reactor temperature then was increased to 75° C. After the temperature had become steady at 75° C., the pressure of the reactor was raised to 300 psig (2.07 MPa) using TFE. Eighty milliliters of an initiating solution consisting of 0.2 wt % APS in water were injected into the reactor. This same initiator was then added at 5.0 mL/min. After polymerization had begun as indicated by a 10 psig (0.07 MPa) drop in reactor pressure, TFE was added at 0.2 lb (90.8 g)/min for 5 min. After 1 lb (454 g) of TFE was fed after initiation, the TFE and initiator feeds were stopped, then the reactor was slowly vented. After stopping agitation, the reactor vapor space was evacuated. Agitation was resumed at 50 rpm, then the contents were cooled to 25° C. The core has an MFR of zero at 372° C. The agitator was again stopped, then the pressure in the reactor was raised to 8 in Hg (3.93 psig, 2.71×10$^{-2}$ MPa) with ethane. After the addition of ethane, the agitator was restarted at 50 rpm and the contents of the reactor were warmed to 75° C. A 200 mL aliquot of perfluoro(ethyl vinyl ether) (PEVE) was added, then the pressure in the reactor was raised to 250 psig (1.75 MPa) with TFE (1.72 MPa). For the duration of the reaction, PEVE was added at 2 mL/min and initiation was resumed using the same solution at a rate of 5 mL/min. The pressure of TFE in the reactor was continuously adjusted to maintain a reaction rate of 0.167 lb TFE/min (75.7 g/min). After 19 lbs (8618 g) TFE reacted in 114 min, the reaction was terminated by stopping TFE, initiator, and PEVE feeds, then venting the reactor. Solids content of the dispersion was 30.2 wt %, and the raw dispersion particle size (RDPS) was 0.099 µm. After coagulation, the polymer was isolated by filtering and then dried in a 150° C. convection air oven. This core/shell polymer had a melt flow rate (MFR) of 4.1 g/10 min, a PEVE content of 2.93 wt %, and a 50 mil MIT flex life of 851 cycles. The core/shell polymer also exhibited a tensile strength of 4075 psi (28.1 MPa) and elongation at break of 353%. The viscosity change was 7780 Pa·s. These results are included in Table 12 below along with results for additional core shell/polymers with increasing core content, wherein the core is PTFE homopolymer. The ratio of core polymer to shell polymer was altered by changing the ratio of the TFE consumed by the first phase of the polymerization and the TFE consumed by the second phase of the polymerization.

Tensile strength and elongation at break were measured both on compression molded plaques by the procedure disclosed under Test Procedures and on strands extruded by the Kayeness capillary rheometer described under Test Procedures operating at 350° C. and 4 s$^{-1}$.

TABLE 12

| Comparative Ex. No. | PTFE Core, wt % | PEVE Content, wt % | PEVE Content in Shell, wt % | MFR, g/10 min | Tensile Strength, MPa plaque | Elongation at Break, % plaque | 1.27 mm MIT Flex Life, cycles | Δη Pa · s | Tensile Strength, MPa strand | Elongation at Break, % strand |
|---|---|---|---|---|---|---|---|---|---|---|
| 50-1 | 4.85 | 2.93 | 3.08 | 4.12 | 28.1 | 353 | 851 | 7780 | 29.2 | 519 |
| 50-2 | 9.71 | 2.85 | 3.16 | 3.34 | 28.3 | 353 | 1016 | 8667 | 27.2 | 487 |
| 50-3 | 19.51 | 2.45 | 3.04 | 0 | 28.4 | 372 | 1796 | 9533 | 30.1 | 334 |
| 50-4 | 29.4 | 2 | 2.83 | 0 | 28.7 | 384 | 2560 | 5180 | 16.7 | 72 |
| 50-5 | 49.33 | 1.35 | 2.66 | 0 | 22 | 275 | 2070 | 19283 | 31.3 | 559 |
| 50-6 | 59.27 | 1.21 | 2.98 | 0 | 20.4 | 298 | 460 | (1) | (1) | (1) |
| 50-7 | 74.42 | 0.77 | 3 | 0 | 16.6 | 219 | 233 | 16500 | 18.5 | 153 |
| 50-8 | 89.76 | 0.28 | 2.61 | 0 | 15.5 | 96 | 116 | 17237 | 8.7 | 46 |

(1) not measured

As shown in Table 12, as the core content for the PTFE homopolymer core increase above 50 wt %, the 1.27 mm MIT Flex Life falls drastically. The same is true for physical properties whether measured on compression molded plaque or extruded strand. An additional core/shell polymer was made, wherein the core constituted 95 wt % of the polymer, and this polymer also exhibited poor MIT Flex Life and poor physical properties.

Example 50B

This Example shows the preparation of core shell polymer in which the shell is melt-fabricable PFA of Comparative Example C, while the core consists of a high molecular weight PTFE modified with PEVE.

A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water and 240 mL of a 20 wt % solution of ammonium perfluorooctanoate surfactant in water. With the reactor paddle agitated at 50 rpm, the reactor was evacuated and purged three times with tetrafluoroethylene (TFE). The reactor temperature then was increased to 75° C. After the temperature had become steady at 75° C., the pressure of the reactor was raised to 250 psig (1.72 MPa) using TFE. Three hundred milliliters of PEVE were rapidly added to the reactor, followed by eighty milliliters of an initiating solution consisting of 0.2 wt % APS in water. This same initiator was then added at 5.0 mL/min. After polymerization had begun as indicated by a 10 psig (0.07 MPa) drop in reactor pressure, additional PEVE was added at a rate of 2.5 mL/min, and TFE was added at 0.2 lb (90.8 g)/min for 20 min. After 4 lb (1816 g) of TFE was fed after initiation, the TFE, PEVE, and initiator feeds were stopped, then the reactor was slowly vented. The core polymer by itself exhibits zero MFR at 372° C. Agitation was resumed at 50 rpm, then the contents were cooled to 25° C. The agitator was again stopped, then the pressure in the reactor was raised to 8 in Hg (3.93 psig, 2.71×10$^{-2}$ MPa) with ethane. After the addition of ethane, the agitator was restarted at 50 rpm and the contents of the reactor were warmed to 75° C. A 200 mL aliquot of perfluoro(ethyl vinyl ether) (PEVE) was added, then the pressure in the reactor was raised to 250 psig (1.75 MPa) with TFE (1.72 MPa). For the duration of the reaction, PEVE was added at 2 mL/min and initiation was resumed using the same solution at a rate of 5 mL/min. The pressure of TFE in the reactor was continuously adjusted to maintain a reaction rate of 0.167 lb TFE/min (75.7 g/min). After 16 lbs (7264 g) TFE reacted in 96 min, the reaction was terminated by stopping TFE, initiator, and PEVE feeds, then venting the reactor. Solids content of the dispersion was 30.2 wt %, and the raw dispersion particle size (RDPS) was 0.078 μm. After coagulation, the polymer was isolated by filtering and then dried in a 150° C. convection air oven. This core/shell polymer had a melt flow rate (MFR) of 4.2 g/10 min, a PEVE content of 3.49 wt %, and a 1.27 mm MIT flex life of 857 cycles. The copolymer also exhibited a tensile strength of 3785 psi (26.1 MPa) and elongation at break of 311%. The viscosity change was 6422 Pa·s. These results are included in as Example 50B-1 in Table 13. Examples 50B-2 to -8 were prepared as described for Example 50B-1 by changing the ratio of the TFE consumed by the first phase of the polymerization and the TFE consumed by the second phase of the polymerization to vary the ratio of core polymer to shell polymer. The PEVE content of the core ranged from 4.9 wt % to 6.5 wt % as the core content of the core/shell polymer increased from 50 wt %. Specific details for Examples 50B-2 to -8 are given in Table 13.

Tensile strength and elongation at break were measured both on compression molded plaques and on strands extruded by the Kayeness capillary rheometer operating at 350° C. and 4 s$^{-1}$.

confirming the melt-fabricability of the core/shell polymer of this embodiment of the present invention.

Example 50C

This Example shows the preparation of core shell polymer in which the shell is melt processible PFA of Comparative Example C while the core consists of a high molecular weight PTFE modified with lesser amount of PEVE. The MIT Flex Life of the PTFE polymer is comparable to PTFE homopolymer by itself, and the core/shell polymer exhibits high thixotropy.

A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water and 240 mL of a 20 wt % solution of ammonium perfluorooctanoate surfactant in water. With the reactor paddle agitated at 50 rpm, the reactor was evacuated and purged three times with tetrafluoroethylene (TFE). The reactor temperature then was increased to 75° C. After the temperature had become steady at 75° C., the pressure of the reactor was raised to 250 psig (1.72 MPa) using TFE. One hundred twenty milliliters of PEVE were rapidly added to the reactor, followed by eighty milliliters of an initiating solution consisting of 0.2 wt % APS in water. This same initiator was then added at 5.0 mL/min. After polymerization had begun as indicated by a 10 psig (0.07 MPa) drop in reactor pressure, additional PEVE was added at a rate of 1.0 mL/min, and TFE was added at 0.2 lb (90.8 g)/min for 5 min. After 1 lb (454 g) of TFE was fed after initiation, the TFE, PEVE, and initiator feeds were stopped, then the reactor was slowly vented. The PEVE-modified core by itself exhibits zero MFR at 372° C. After stopping agitation, the reactor vapor space was evacuated. Agitation was resumed at 50 rpm, then the contents were cooled to 25° C. The agitator was again stopped, then the pressure in the reactor was raised to 8 in Hg (3.93 psig, 2.71×10$^{-2}$ MPa) with

TABLE 13

| Ex. No. | Core, Content, wt % | Overall PEVE Content, wt % | MFR, g/10 min | Tensile Strength, MPa, plaque | Elongation at Break, %, plaque | 1.27 mm MIT Flex Life, cycles | Δη Pa·s | Tensile Strength, MPa, strand | Elongation at Break, %, strand |
|---|---|---|---|---|---|---|---|---|---|
| 50B-1 | 19.3 | 3.49 | 4.16 | 26.1 | 310.99 | 857 | 5771 | 23 | 510 |
| 50B-2 | 28.85 | 3.85 | 5.78 | 28 | 315.75 | 1012 | 6422 | 25.5 | 429 |
| 50B-3 | 47.9 | 4.21 | 3.14 | 27.9 | 297.8 | 2713 | 8940 | 29.3 | 527 |
| 50B-4 | 57.3 | 4.5 | 0.546 | 29.2 | 282.583 | 5289 | 8761 | 33.2 | 428 |
| 50B-5 | 71.41 | 4.79 | 0.526 | 29.6 | 278.613 | 6673 | 7673 | 36.2 | 492 |
| 50B-6 | 85.52 | 4.98 | 0.391 | 30 | 283.213 | 5360 | 7363 | 19 | 208 |
| 50B-7 | 90.04 | 5.22 | 0.35 | 30.7 | 291.569 | 7216 | 6812 | 27.8 | 416 |
| 50B-8 | 90.14 | 5.11 | 0.346 | 30.4 | 281.47 | 13452 | 6805 | 30.4 | 350 |

As shown in Table 13, the 1.27 mm MIT Flex Life increases from that when the core comprises 47.9 wt % of the core/shell polymer. This increase is large, as compared to the results reported in Table 12. In Table 12, the 1.27 mm MIT Flex Life decreases from 2070 cycles to 116 cycles with increasing core wt %. In contrast, the increase in Flex Life shown is Table 13 is from about 2700 cycles (47.9 wt % core) to 13452 cycles with increasing core wt %. The core/shell polymers of Examples 50B4 to -8 exhibit a surprisingly high retention of tensile and elongation properties (molded plaque), the elongation being at least 250% and tensile strength being at least 25 MPa. Strands extruded from melt core/shall polymer also exhibit high elongation and strength, ethane. After the addition of ethane, the agitator was restarted at 50 rpm and the contents of the reactor were warmed to 75° C. A 200 mL aliquot of perfluoro(ethyl vinyl ether) (PEVE) was added, then the pressure in the reactor was raised to 250 psig (1.75 MPa) with TFE (1.72 MPa). For the duration of the reaction, PEVE was added at 2 mL/min and initiation was resumed using the same solution at a rate of 5 mL/min. The pressure of TFE in the reactor was continuously adjusted to maintain a reaction rate of 0.167 lb TFE/min (75.7 g/min). After 19 lbs (8618 g) TFE reacted in 114 min, the reaction was terminated by stopping TFE, initiator, and PEVE feeds, then venting the reactor. Solids content of the dispersion was 30.1 wt %, and the raw dispersion particle size (RDPS) was 0.099 μm. After coagulation, the polymer was isolated by filtering and then dried in a 150° C. convection air oven. This core/shell polymer had a melt flow rate (MFR) of 12.9 g/10 min, a PEVE content of 3.20 wt %, and a 1.27 mil MIT flex life of 840.4 cycles. The copolymer also exhibited a tensile strength of 4203 psi (29.0 MPa) and elongation at break of 338%. The viscosity change was 3816 Pa·s. These results are included in Table 14 as Example 50C-1 along with the results at increasing core content for Examples 50C-2 to -10. The ratio of core polymer to shell polymer was altered by changing the ratio of the TFE consumed by the first phase of the polymerization and the TFE consumed by the second phase of the polymerization. The PEVE content of the core as the core content increased from 50 wt % was 1.82 wt % to 2.32 wt %.

Tensile strength and elongation at break were measured on compression molded plaques and on strands extruded by the Kayeness capillary rheometer operating at 350° C. and 4 s$^{-1}$.

TABLE 14

| Ex. No. | Core Content, wt % | Overall PEVE Content, wt % | MFR, g/10 min | Tensile Strength, MPa, plaque | Elongation at Break, %, plaque | 1.27 mm MIT Flex Life, cycles |
|---|---|---|---|---|---|---|
| 50C-1 | 4.84 | 3.2 | 12.9 | 29 | 338 | 840 |
| 50C-2 | 9.68 | 3.24 | 9.7 | 28.3 | 327 | 976 |
| 50C-3 | 19.43 | 2.84 | 3.9 | 28.9 | 314 | 1490 |
| 50C-4 | 29.14 | 2.87 | 2.3 | 27.9 | 317 | 1830 |
| 50C-5 | 48.63 | 2.75 | 1.8 | 28.1 | 310 | 2344 |
| 50C-6 | 48.79 | 2.42 | 0 | 29.5 | 321 | 9683 |
| 50C-7 | 58.99 | 1.68 | 0.1 | 30.6 | 370 | 3139 |
| 50C-8 | 73.84 | 1.54 | 0 | 24.3 | 276 | 16967 |
| 50C-9 | 88.42 | 1.76 | 0 | 29.9 | 293 | 41521 |
| 50C-10 | 93.45 | 1.63 | 0 | 30.8 | 312 | 102683 |

The thixotropy of core/shall polymer of Examples 50C-1 to -10 was high, exceeding 30000 at core contents of 48.79 wt % and above. The 1.27 mm MIT Flex Life for the polymers of Examples 50C-9 and -10 was extremely high, and the tensile strength and elongation were essentially retained as the core content increased from 50 wt %.

The invention claimed is:

1. A core/shell polymer, the core of said polymer comprising non-melt flowable polytetrafluoroethylene and the shell of said polymer comprising melt-fabricable perfluoropolymer, said core/shell polymer being melt-fabricable, wherein said core/shell polymer has a particle size of less than about 1 micrometer, wherein said non-melt flowable polytetrafluoroethylene has a melt creep viscosity of at least 1×10$^6$ Pa·s at 380° C., and wherein said melt-fabricable perfluoropolymer has a melt flow rate of at least 0.1 g/10 min at 372° C. as measured in accordance with Table 2 of ASTM D-1238-94a.

2. The core shell polymer of claim 1 wherein said core has an average size of less than 0.2 micrometer as determined by the light scattering method of ASTM D4464.

3. The core/shell polymer of claim 1 wherein said perfluoropolymer comprises a copolymer of tetrafluoroethylene with perfluoro(alkyl vinyl ether).

4. The core/shell polymer of claim 1 wherein said non-melt flowable polytetrafluoroethylene constitutes at least about 0.1 wt % of the combined weight of said non-melt flowable polytetrafluoroethylene and said melt-fabricable perfluoropolymer.

5. The core/shell polymer of claim 4 wherein an effective amount of said melt-fabricable perfluoropolymer is present in said shell so that in melt-mixing said core/shell polymer, a continuous phase of said melt-fabricable perfluoropolymer is formed, with said non-melt flowable polytetrafluoroethylene core being dispersed therein.

6. The core/shell polymer of claim 5 wherein said non-melt flowable polytetrafluoroethylene constitutes up to about 75 wt % based on the combined weight of said non-melt flowable polytetrafluoroethylene and said melt-fabricable perfluoropolymer.

7. The core/shell polymer of claim 1 wherein said non-melt flowable polytetrafluoroethylene constitutes about 4 to 40 wt % of the combined weight of said non-melt flowable polytetrafluoroethylene and said melt-fabricable perfluoropolymer.

8. The core/shell polymer of claim 1 wherein said polytetrafluoroethylene is modified.

9. The core/shell polymer of claim 8 wherein said polymer contains at least 50 wt % of said core and the amount of the modifier of said polytetrafluoroethylene is at least 1.5 wt %.

10. Compression molded article either of said core/shell polymer of claim 1 or of a melt-mixed blend of said core/shell polymer.

11. The core/shell polymer of claim 1, wherein said core of said core/shell polymer comprises at least 50 wt % thereof, said non-melt flowable polytetrafluoroethylene of said core containing at least 1.5 wt % of modifier, said core/shell polymer exhibiting thixotropy when melt blended, said thixotropy being characterized by a reduction in melt viscosity upon increasing shear rate from about 10 s$^{-1}$ to about 100 s$^{-1}$ that is at least 10% greater than the reduction in melt viscosity at the same shear rates for the melt-fabricable perfluoropolymer by itself, as determined by the capillary rheometer method.

12. The core/shell polymer of claim 1 wherein said core of said core/shell polymer comprises at least 50 wt % thereof, said non-melt flowable polytetrafluoroethylene of said core containing at least 1.5wt % of modifier, said core/shell polymer exhibiting a 1.27 mm MIT Flex Life of at least 2500 cycles.

13. The core/shell polymer of claim 12 exhibiting an elongation of at least 250%.

14. The core/shell polymer of claim 12 wherein said core comprises at least 80 wt % of said polymer and said MIT Flex Life is at least 5000 cycles.

15. The core/shell polymer of claim 12 wherein said core comprises at least 90 wt % of said polymer and said MIT Flex Life is at least 7000 cycles.

16. The core/shell polymer of claim 12 wherein said modifier is fluorinated vinyl ether.

17. Blend obtained by melt mixing the core/shell polymer of claim 1.

18. A process comprising melt blending a core/shell polymer, the core of said polymer comprising non-melt flowable polytetrafluoroethylene and the shell of said polymer comprising melt-fabricable perfluoropolymer, said melt blend exhibiting thixotropy characterized by a reduction in melt viscosity upon increasing the shear rate from about 10 s$^{-1}$ to about 100 s$^{-1}$ that is at least about 10% greater than the reduction in melt viscosity at the same shear rates for the melt-fabricable perfluoropolymer by itself, as determined by the capillary rheometer method, wherein said core/shell polymer has a particle size of less than about 1 micrometer, wherein said non-melt flowable polytetrafluoroethylene has a melt creep viscosity of at least 1×10$^6$ Pa·s at 380° C., and wherein said melt-fabricable perfluoropolymer has a melt flow rate of at least 0.1 g/10 min at 372° C. as measured in accordance with Table 2 of ASTM D-1238-94a.

19. The process of claim 18 wherein said core/shell polymer exhibits an elongation of at least 200%, and wherein at least 30 wt % of said core/shell polymer is said core.

20. The process of claim 18 wherein said melt blending produces a dispersion of core in a continuous phase of said melt-fabricable perfluoropolymer.

21. The process of claim 20 wherein said melt blending includes the melt blending of said core/shell polymer and independently supplied perfluoropolymer, said independently supplied perfluoropolymer being compatible with said perfluoropolymer of said shell, said independently supplied perfluoropolymer and said perfluoropolymer of said shell forming said continuous phase.

22. The core/shell polymer of claim 1 wherein said perfluoropolymer comprises a copolymer of tetrafluoroethylene with perfluoroolefin having 3 to 8 carbon atoms.

* * * * *